US012725292B2

(12) United States Patent
Iwahori et al.

(10) Patent No.: US 12,725,292 B2
(45) Date of Patent: Sep. 1, 2026

(54) POSITION ESTIMATION DEVICE, POSITION ESTIMATION SYSTEM, AND POSITION ESTIMATION METHOD

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 18/610,925

(22) Filed: Mar. 20, 2024

(65) Prior Publication Data

US 2024/0362817 A1 Oct. 31, 2024

(30) Foreign Application Priority Data

Apr. 26, 2023 (JP) ................................ 2023-072118

(51) Int. Cl.
*G06T 7/70* (2017.01)
*G06T 3/18* (2024.01)

(52) U.S. Cl.
CPC . *G06T 7/70* (2017.01); *G06T 3/18* (2024.01)

(58) Field of Classification Search
None
See application file for complete search history.

(56) References Cited

U.S. PATENT DOCUMENTS 8,878,835 B2 * 11/2014 Birtwistle ................ G06T 5/77 345/626
2009/0290809 A1 * 11/2009 Yamada ................ H04N 19/17 382/266
2017/0320529 A1 11/2017 Nordbruch
(Continued)

FOREIGN PATENT DOCUMENTS

CN 111256651 A 6/2020
JP 2010-020729 A 1/2010
(Continued)

OTHER PUBLICATIONS

Detection of 3D Bounding Boxes of Vehicles Using Perspective Transformation for Accurate Speed Measurement Viktor Kocur (Year: 2020).*

(Continued)

*Primary Examiner* — Nancy Bitar
(74) *Attorney, Agent, or Firm* — Oliff PLC

(57) ABSTRACT

A position estimation device that estimates a position of a moving object includes: an acquisition unit that acquires a captured image including the moving object from an imaging device; a position calculation unit that calculates a local coordinate point that indicates the position of the moving object in a local coordinate system using the captured image; a type identification unit that identifies a type of the moving object included in the captured image; and a position transformation unit that transforms the local coordinate point into a moving object coordinate point that indicates the position of the moving object in a global coordinate system using an (Continued)

imaging parameter calculated based on the position of the imaging device in the global coordinate system and a moving object parameter determined according to the type of the moving object.

10 Claims, 19 Drawing Sheets

(56) References Cited

U.S. PATENT DOCUMENTS

2018/0189951 A1* 7/2018 Liston .................... G06T 7/194
2020/0302192 A1* 9/2020 Ogata .................... G06V 20/58
2022/0277478 A1* 9/2022 Teng ......................... G06T 7/73
2023/0127188 A1* 4/2023 Sevecek ................. G06V 10/26
382/275
2023/0222790 A1* 7/2023 Tang ......................... G06T 7/73
382/103
2023/0245427 A1* 8/2023 Tsunoda ............. G06V 10/7715
382/103
2024/0054804 A1* 2/2024 Hirakawa ................. G06T 7/00
2024/0161520 A1* 5/2024 Li .......................... G06N 3/044

FOREIGN PATENT DOCUMENTS

JP 2017-538619 A 12/2017
JP 2019-066333 A 4/2019

OTHER PUBLICATIONS

Chen et al., “Monocular Vehicle 3D Bounding Box Estimation Using Homography and Geometry in Traffic Scene,” ICASSP, IEEE, 2022, p. 1995-1999.

* cited by examiner 1
5
REMOTE CONTROL DEVICE
7
POSITION ESTIMATION DEVICE
N
9,902
RG,RG2
9,901
RG,RG1
10
2
VEHICLE CONTROL DEVICE
10e
60

72
DEVICE CPU
DEVICE ACQUISITION UNIT
721
VEHICLE TYPE IDENTIFICATION UNIT
723
POSITION TRANSFORMATION UNIT
724
DEVICE TRANSMISSION UNIT
725
722
POSITION CALCULATION UNIT
DISTORTION CORRECTION UNIT
722a
ROTATION PROCESSING UNIT
722b
TRIMMING UNIT
722c
DETECTION UNIT
722d
PERSPECTIVE TRANSFORMATION UNIT
722e
COORDINATE POINT CALCULATION UNIT
722f

SERVER
START
S1
ACQUIRE VEHICLE LOCATION INFORMATION USING DETECTION RESULT FROM EXTERNAL SENSOR
S2
DETERMINE NEXT TARGET LOCATION
S3
GENERATE RUNNING CONTROL SIGNAL
S4
TRANSMIT RUNNING CONTROL SIGNAL TO VEHICLE
END
VEHICLE
START
S5
RECEIVE RUNNING CONTROL SIGNAL FROM SERVER
S6
CONTROL ACTUATOR USING RUNNING CONTROL SIGNAL
END

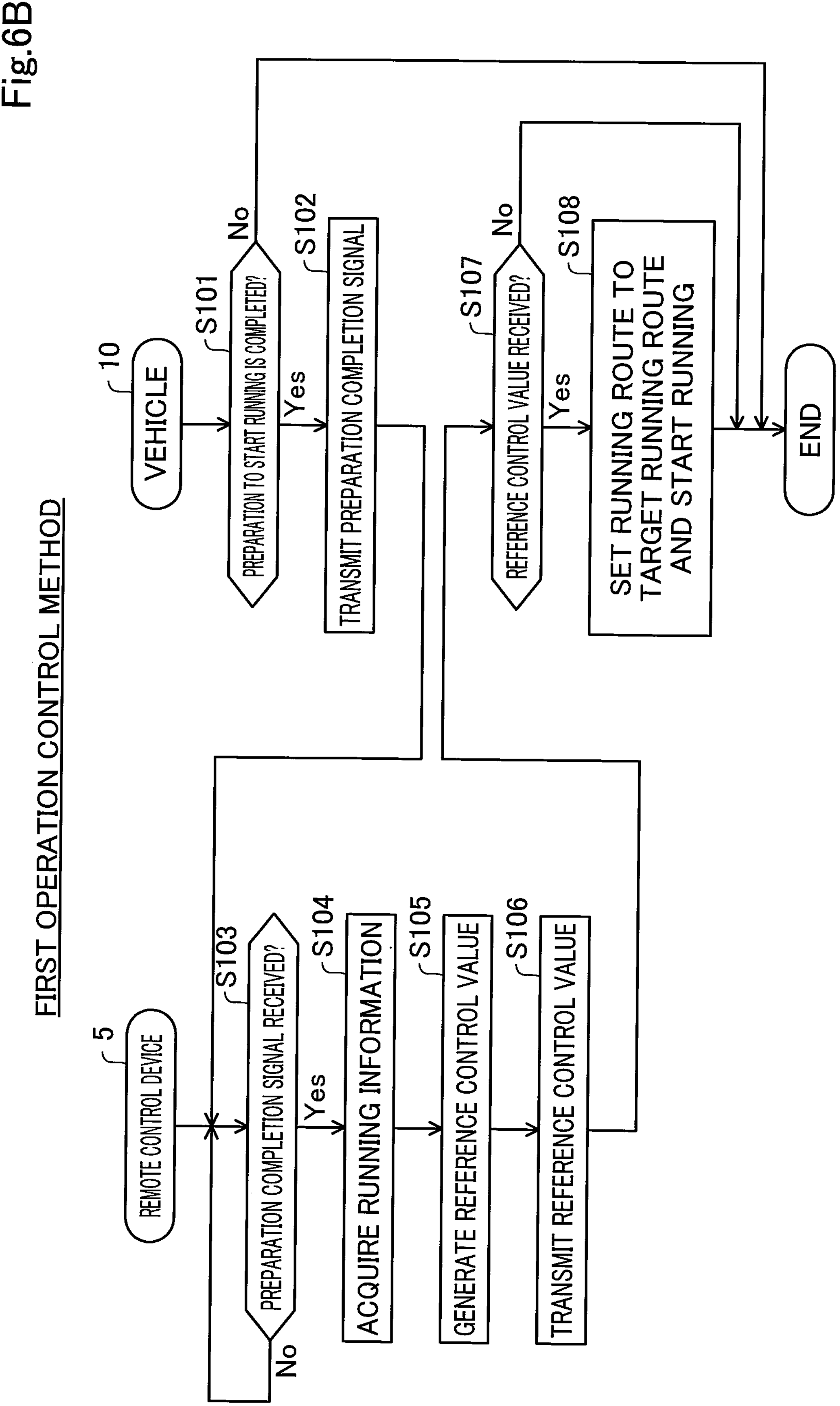
Fig.6B
FIRST OPERATION CONTROL METHOD
5
REMOTE CONTROL DEVICE
S103
PREPARATION COMPLETION SIGNAL RECEIVED?
Yes
No
S104
ACQUIRE RUNNING INFORMATION
S105
GENERATE REFERENCE CONTROL VALUE
S106
TRANSMIT REFERENCE CONTROL VALUE
10
VEHICLE
S101
PREPARATION TO START RUNNING IS COMPLETED?
Yes
No
S102
TRANSMIT PREPARATION COMPLETION SIGNAL
S107
REFERENCE CONTROL VALUE RECEIVED?
Yes
No
S108
SET RUNNING ROUTE TO TARGET RUNNING ROUTE AND START RUNNING
END SECOND OPERATION CONTROL METHOD
5
REMOTE CONTROL DEVICE
S201
MODIFICATION TIMING?
Yes
No
S202
ACQUIRE RUNNING INFORMATION
S203
GENERATE MODIFIED CONTROL VALUE
S204
TRANSMIT MODIFIED CONTROL VALUE
10
VEHICLE
S205
MODIFIED CONTROL VALUE RECEIVED?
Yes
No
S206
MODIFY RUNNING ROUTE TO CORRECTED RUNNING ROUTE AND START RUNNING
RETURN START POSITION ESTIMATION METHOD
IMAGE ACQUISITION STEP
S31
DISTORTION CORRECTION STEP
S321
ROTATION PROCESSING STEP
S322
TRIMMING STEP
S323
DETECTION STEP
S324
PERSPECTIVE TRANSFORMATION STEP
S325
COORDINATE POINT CALCULATION STEP
S326
POSITION CALCULATION STEP (S32)
VEHICLE TYPE IDENTIFICATION STEP
S33
PARAMETER ACQUISITION STEP
S34
POSITION TRANSFORMATION STEP
S37
END Im1
10
60
61
Xc
Yc
STEP S31
Im2
10
60
61
Xc
Yc
STEP S321
Im3
A1
A2
10
60
61
Xc
Yc
STEP S322
Im4
10
60
61
Xc
Yc
STEP S323
Im5
Ms
Xc
Yc
STEP S324
Im6
Ms
Xi
Yi
STEP S325

Im5
Ms
V
R0
C
ROTATION
Im5
Ms
R1
V
C
P0
INVERSE ROTATION
Im5
Ms
R1
V
C
P0

9
Pc
H
Pf
D
Do
h
Pv
ΔD
10e
P3
10
60
Xg

72a
DEVICE CPU
722
POSITION CALCULATION UNIT
722a
DISTORTION CORRECTION UNIT
722b
ROTATION PROCESSING UNIT
722c
TRIMMING UNIT
722d
DETECTION UNIT
722e
PERSPECTIVE TRANSFORMATION UNIT
722f
COORDINATE POINT CALCULATION UNIT
721
DEVICE ACQUISITION UNIT
723
VEHICLE TYPE IDENTIFICATION UNIT
724
POSITION TRANSFORMATION UNIT
725
DEVICE TRANSMISSION UNIT
726
CORRECTION VALUE SETTING UNIT

9
H
Pf
Pc
D
Do
Δh
hs
h
Pv
ΔD
10e
P3
10
60
Xg

POSITION ESTIMATION DEVICE, POSITION ESTIMATION SYSTEM, AND POSITION ESTIMATION METHOD

CROSS-REFERENCE TO RELATED APPLICATIONS

This application claims priority to Japanese Patent Application No. 2023-072118 filed on Apr. 26, 2023, which is incorporated herein by reference in its entirety.

BACKGROUND

Field

The present disclosure relates to a position estimation device, a position estimation system, and a position estimation method.

Related Art

Vehicles that automatically run by remote control have hitherto been known (JP2017-538619A).

When a vehicle is made to run automatically by remote control, it is necessary to estimate the position of the vehicle. The present inventors have found that accuracy in the position estimation of a vehicle is likely to decrease when the position estimation of a vehicle is performed by using captured images that are acquired by capturing images of an imaging range including the vehicle from outside of the vehicle because of the differences in the vehicle class and other characteristics, which depend on the type of vehicle. Above problem is common not only to vehicles but also to moving objects.

SUMMARY

The present disclosure may be realized by the following aspects.

(1) According to the first aspect of the present disclosure, a position estimation device is provided. The position estimation device that estimates a position of a moving object comprises: an acquisition unit that acquires a captured image including the moving object from an imaging device; a position calculation unit that calculates a local coordinate point that indicates the position of the moving object in a local coordinate system (a local coordinate system) using the captured image; a type identification unit that identifies a type of the moving object included in the captured image; and a position transformation unit that transforms the local coordinate point into a moving object coordinate point that indicates the position of the moving object in a global coordinate system using an imaging parameter calculated based on the position of the imaging device in the global coordinate system and a moving object parameter determined according to the type of the moving object. According to the above aspect, the type of the moving object included in the captured image can be identified and the moving object parameter according to the type of the moving object can be acquired. The above aspect also enables position estimation of a moving object from captured images using the moving object parameter according to the type of the moving object. In this way, the position of the moving object can be estimated in consideration of the type of moving object. This prevents a decrease in accuracy in the position estimation of moving objects due to difference in the moving object class, etc. depending on the type of moving object.

(2) The aspect described above may further comprise a direction information generation unit that generates direction information that indicates a movement direction of the moving object using the moving object coordinate point. According to the above aspect, the direction information can be generated using the position information of the moving object. In this way, the actual running trajectory and movement direction of a running moving object can be estimated.

(3) The aspect described above may be such that when the local coordinate point is transformed into the moving object coordinate point, the position transformation unit substitutes a value of the moving object parameter acquired by the acquisition unit into a relational expression, which includes the moving object coordinate point as an objective variable and the local coordinate point, the imaging parameter, and the moving object parameter as explanatory variables. According to the above aspect, the local coordinate point can be transformed into a moving object coordinate point by substituting the value of the moving object parameter acquired by the acquisition unit into a relational expression, which includes the moving object coordinate point as the objective variable and the local coordinate point, the imaging parameter, and the moving object parameter as the explanatory variables.

(4) The aspect described above may further comprise a correction value setting unit that calculates a difference between the moving object parameter acquired by the acquisition unit and a reference parameter that indicates a reference value of the moving object parameter to set a correction parameter, which indicates a correction value relative to the reference parameter and is determined according to the type of the moving object identified by the type identification unit, and may be such that, when the local coordinate point is transformed into the moving object coordinate point, the position transformation unit substitutes the correction parameter set by the correction value setting unit into a relational expression, which includes the moving object coordinate point as an objective variable and the local coordinate point, the imaging parameter, the reference parameter, and the correction parameter as explanatory variables. According to the above aspect, the type of the moving object in the captured image can be identified, and the correction parameter according to the type of the moving object can be calculated. Further, the local coordinate point can be transformed into the moving object coordinate point by substituting the correction parameter set by the correction value setting unit into the relational expression, which includes the moving object coordinate point as the objective variable and the local coordinate point, the imaging parameter, the reference parameter, and the correction parameter as explanatory variables.

(5) The aspect described above may be such that, when the type of the moving object identified by the type identification unit is a predetermined type, the correction value setting unit sets the correction parameter to zero without calculating the difference. According to the above aspect, when the type of the moving object identified by the type identification unit is a predetermined type, it is possible to set the correction parameter to zero without calculating the difference between the moving object parameter and the reference parameter.

(6) The aspect described above may be such that the imaging parameter is a height of the imaging device from a road surface calculated based on the position of the imaging device in the global coordinate system, and the moving object parameter is a height of a predetermined positioning point of the moving object from the road surface. According to the above aspect, it is possible to transform the local coordinate point into the moving object coordinate point using the ratio of the height of the imaging device from the road surface to the height of the positioning point of the moving object from the road surface.

(7) The aspect described above may be such that the position calculation unit comprises: a detection unit that generates a first mask image to which a mask region masking the moving object in the captured image is added; a perspective transformation unit that performs perspective transformation of the first mask image; and a coordinate point calculation unit that corrects a first coordinate point using a second coordinate point, the first coordinate point being a specified vertex of a first bounding rectangle set in the mask region in the first mask image, the second coordinate point being a vertex that indicates the same position as the first coordinate point from among vertices of a second bounding rectangle set in the mask region in a second mask image that is obtained by perspective transformation of the first mask image. According to the above aspect, it is possible to generate the first mask image to which a mask region masking the moving object in the captured image is added, and the second mask image obtained by perspective transformation of the first mask image. In this way, the first coordinate point can be extracted from the first mask image and the second coordinate point can be extracted from the second mask image. Then, by correcting the first coordinate point using the second coordinate point, the local coordinate point can be calculated. This allows for more accurate calculation of local coordinate points.

(8) The aspect described above may be such that the position calculation unit further comprises a rotation processing unit that rotates the captured image so that a movement direction of the moving object faces a predetermined direction. According to the above aspect, the captured image can be rotated so that the direction of the vector indicating the movement direction of the moving object faces a predetermined direction. In this way, the moving object included in the captured image can be detected with the direction of the vector indicating the movement direction of the moving object unified. This improves the accuracy in the position estimation of the moving object.

(9) The aspect described above may be such that the position calculation unit further comprises a distortion correction unit that corrects distortion in the captured image. According to the above aspect, the distortion of the captured image can be corrected. This further improves the accuracy in the position estimation of the moving object.

(10) According to the second aspect of the present disclosure, a position estimation system is provided. The position estimation system that estimates the position of a moving object comprises: a moving object; an imaging device that acquires a captured image including the moving object subjected to position estimation; and the position estimation device according to the aforementioned aspect. According to the above aspect, the type of the moving object included in the captured image can be identified and the moving object parameter according to the type of the moving object can be acquired. The above aspect also enables position estimation of a moving object from captured images using the moving object parameter according to the type of the moving object. In this way, the position of the moving object can be estimated in consideration of the type of moving object. This prevents a decrease in accuracy in the position estimation of moving objects due to difference in the moving object class, etc. depending on the type of moving object.

(11) According to the third aspect of the present disclosure, a position estimation method is provided. The position estimation method for estimating the position of a moving object comprises: an acquisition step of acquiring a captured image including the moving object from an imaging device; a position calculation step of calculating a local coordinate point that indicates the position of the moving object in a local coordinate system using the captured image; a moving object type identification step of identifying a type of the moving object included in the captured image; and a position transformation step of transforming the local coordinate point into a moving object coordinate point that indicates the position of the moving object in a global coordinate system using an imaging parameter calculated based on the position of the imaging device in the global coordinate system and a moving object parameter determined according to the type of the moving object. According to the above aspect, the type of the moving object included in the captured image can be identified and the moving object parameter according to the type of the moving object can be acquired. The above aspect also enables position estimation of a moving object from captured images using the moving object parameter according to the type of the moving object. In this way, the position of the moving object can be estimated in consideration of the type of moving object. This prevents a decrease in accuracy in the position estimation of moving objects due to difference in the moving object class, etc. depending on the type of moving object.

(12) According to the fourth aspect of the present disclosure, a computer program is provided. The computer program used for position estimation of a moving object comprises: an acquisition function of acquiring a captured image including the moving object from an imaging device; a position calculation function of calculating a local coordinate point that indicates the position of the moving object in a local coordinate system using the captured image; a moving object type identification function of identifying a type of the moving object included in the captured image; and a position transformation function of transforming the local coordinate point into a moving object coordinate point that indicates the position of the moving object in a global coordinate system using an imaging parameter calculated based on the position of the imaging device in the global coordinate system and a moving object parameter determined according to the type of the moving object. According to the above aspect, the type of the moving object included in the captured image can be identified and the moving object parameter according to the type of the moving object can be acquired. The above aspect also enables position estimation of a moving object from captured images using the moving object parameter according to the type of the moving object. In this way, the position of the moving object can be estimated in consideration of the type of moving object. This prevents a decrease in accuracy in the position estimation of moving objects due to difference in the moving object class, etc. depending on the type of moving object.

The present disclosure may be embodied in various forms other than the position estimation device, the position estimation system, the position estimation method, and the computer program described above. For example, the present disclosure may be embodied in aspects as a method for producing a position estimation device, a method for controlling a position estimation device and a position estimation system, and the like.

BRIEF DESCRIPTION OF THE DRAWINGS

FIG. 6B is a flowchart of a first operation control method;

DETAILED DESCRIPTION

A. First Embodiment

A-1. Structure of Position Estimation System

Figure 1:
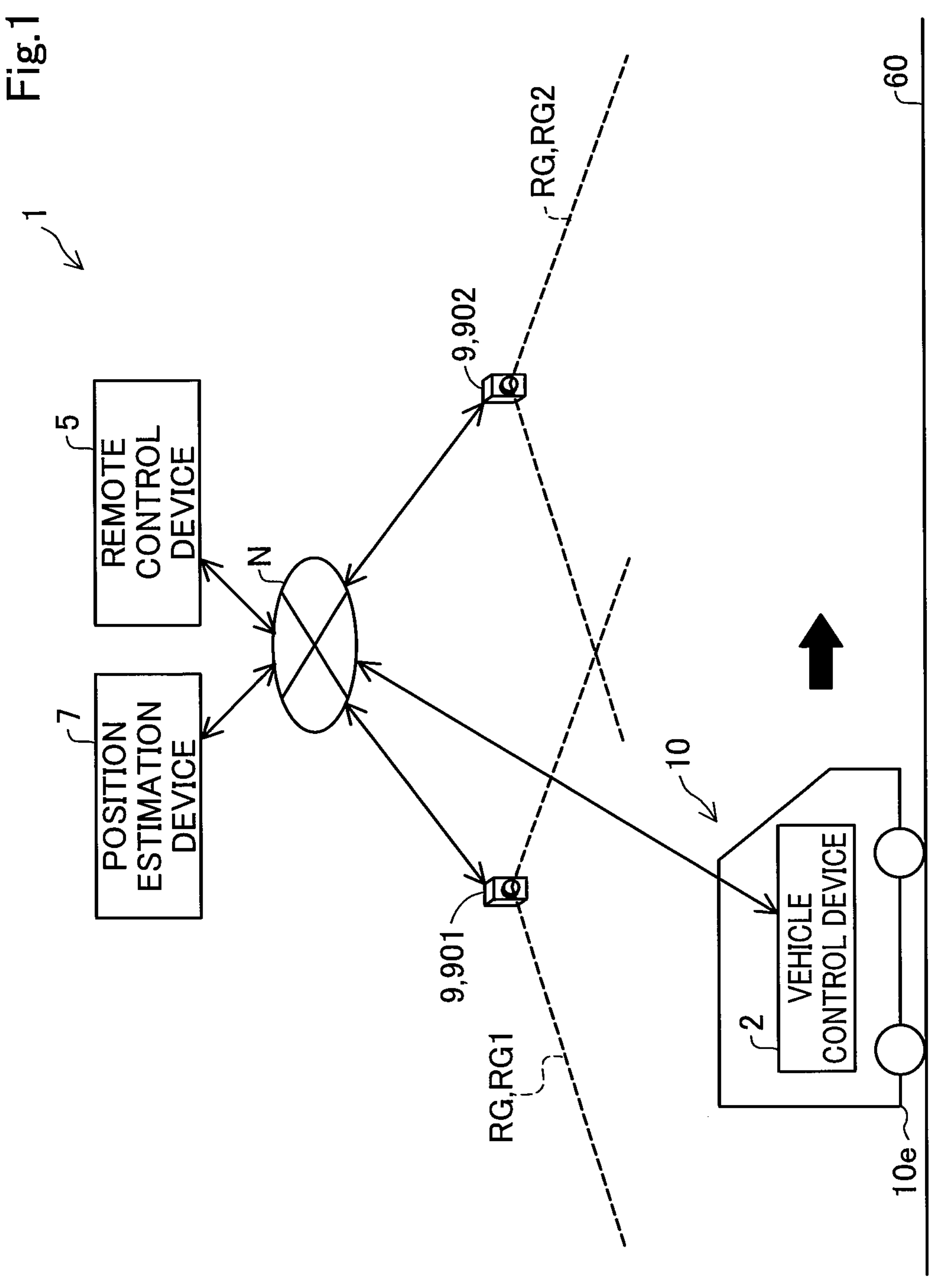
FIG. 1 illustrates a schematic structure of a position estimation system.

FIG. 1 illustrates a schematic structure of a position estimation system 1. The position estimation system 1 is a system for estimating the position of a vehicle 10 as a moving object. The position estimation system 1 includes one or more vehicles 10, an imaging device 9, and a position estimation device 7 that estimates the positions of the vehicles 10.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicles 10 are configured to be able to run by unmanned driving. The vehicle 10 is configured to be capable of running by unmanned driving. The "unmanned driving" means driving independent of running operation by a passenger. The running operation means operation relating to at least one of "run," "turn," and "stop" of the vehicle 10. The unmanned driving is realized by automatic remote control or manual remote control using a device provided outside the vehicle 10 or by autonomous control by the vehicle 10. A passenger not involved in running operation may be on-board a vehicle running by the unmanned driving. The passenger not involved in running operation includes a person simply sitting in a seat of the vehicle 10 and a person doing work such as assembly, inspection, or operation of switches different from running operation while on-board the vehicle 10. Driving by running operation by a passenger may also be called "manned driving."

In the present specification, the "remote control" includes "complete remote control" by which all motions of the vehicle 10 are completely determined from outside the vehicle 10, and "partial remote control" by which some of the motions of the vehicle 10 are determined from outside the vehicle 10. The "autonomous control" includes "complete autonomous control" by which the vehicle 10 controls a motion of the vehicle 10 autonomously without receiving any information from a device outside the vehicle 10, and "partial autonomous control" by which the vehicle 10 controls a motion of the vehicle 10 autonomously using information received from a device outside the vehicle 10.

The imaging device 9 acquires captured images by capturing an imaging range RG including the vehicles 10 subjected to position estimation from outside of the vehicles 10. The imaging device 9 transmits the captured images to the position estimation device 7, together with camera identification information (camera ID) to identify a plurality of imaging devices 9 one another as well as the timing of acquisition of the captured images. The captured images sent to the position estimation device 7 are used to estimate the positions of the vehicles 10. Each captured image is a two-dimensional image formed of a set of pixels aligned in the XcYc plane of the camera coordinate system. The camera coordinate system is a coordinate system with the focal point of the imaging device 9 as the origin and the coordinate axes indicated by the Xc axis and the Yc axis, which is orthogonal to the Xc axis. The captured image contains at least two-dimensional data of the vehicle 10 subjected to the position estimation. The captured image is preferably a color image, but may also be a gray image. The imaging device 9 is, for example, an infrastructure camera equipped with an imaging device such as a CCD image sensor or CMOS image sensor, and an optical system.

In the present embodiment, the imaging device 9 acquires captured images of a road surface 60 and the vehicle 10 running on the road surface 60 from an overhead view. The location and number of the imaging devices 9 are determined by considering the imaging range RG (angle of view) or the like of each imaging device 9 to capture the entire road surface 60 by one or more imaging devices 9. Specifically, the imaging devices 9 are installed so that a first imaging range RG1, which is the imaging range RG of a first imaging device 901, and a second imaging range RG2, which is the imaging range RG of a second imaging device 902, overlap. The first imaging device 901 and the second imaging device 902 are adjacent to each other. Further, each imaging device 9 is installed at a position where an image of a predetermined positioning point 10*e* for a specific portion of the vehicle 10 running on the road surface 60 can be captured. In the present embodiment, the positioning point 10*e* is the rear end in the left side surface (hereinafter referred to as a left rear end) of the vehicle 10. The positioning point 10*e* may be a portion other than the left rear end of the vehicle 10. The imaging device 9 may also acquire information from the front, rear, side, etc. of the vehicle 10, in addition to the information from above the vehicle 10. The imaging device 9 may transmit captured images to a remote control device 5 (server).

The vehicle 10 has a manned driving mode and a remote automatic driving mode. The manned driving mode is a driving mode in which the driver in the vehicle 10 operates the steering wheel, accelerator, and other driver input devices (not shown) provided in the vehicle 10 and thereby determines the running conditions of the vehicle 10 to cause the vehicle 10 to run. The running conditions here mean conditions that specify the running operation of the vehicle 10. The running conditions include, for example, the running route, position/location, running speed, acceleration, and steering angle of the wheels of the vehicle 10. The remote automatic driving mode is a driving mode in which the vehicle 10 receives the running conditions of the vehicle 10 from outside of the vehicle 10 and thereby automatically runs with no drivers on board the vehicle 10. When the vehicle 10 runs in the remote automatic driving mode, the vehicle 10 runs automatically by controlling the operation of the driving device or the like, which is described later, installed in the vehicle 10, according to the control value received from the remote control device 5, such as a server, provided at a site different from the vehicle 10. In the present embodiment, the vehicle 10 runs in the remote automatic driving mode in a factory where the vehicle 10 is produced by executing a plurality of production steps. The factory is not limited to those present in a single building or those present at one property or one address. The factory may be present across multiple buildings, multiple properties, multiple addresses, and the like. At this time, the vehicle 10 may run not only on private roads but also on public roads. Further, the position estimation system 1 may also estimate the position of the vehicle 10 running outside the factory.

The vehicle 10 is, for example, an electric vehicle, a hybrid vehicle, a fuel cell vehicle, a gasoline vehicle, or a diesel vehicle. The vehicle 10 may be a private vehicle such as a passenger car, and may also be a business-purpose vehicle such as a truck, a bus, a construction vehicle, and the like. The vehicle 10 includes both a vehicle 10 completed as a product and a vehicle 10 as a semi-finished product or in-process product.

Figure 2:
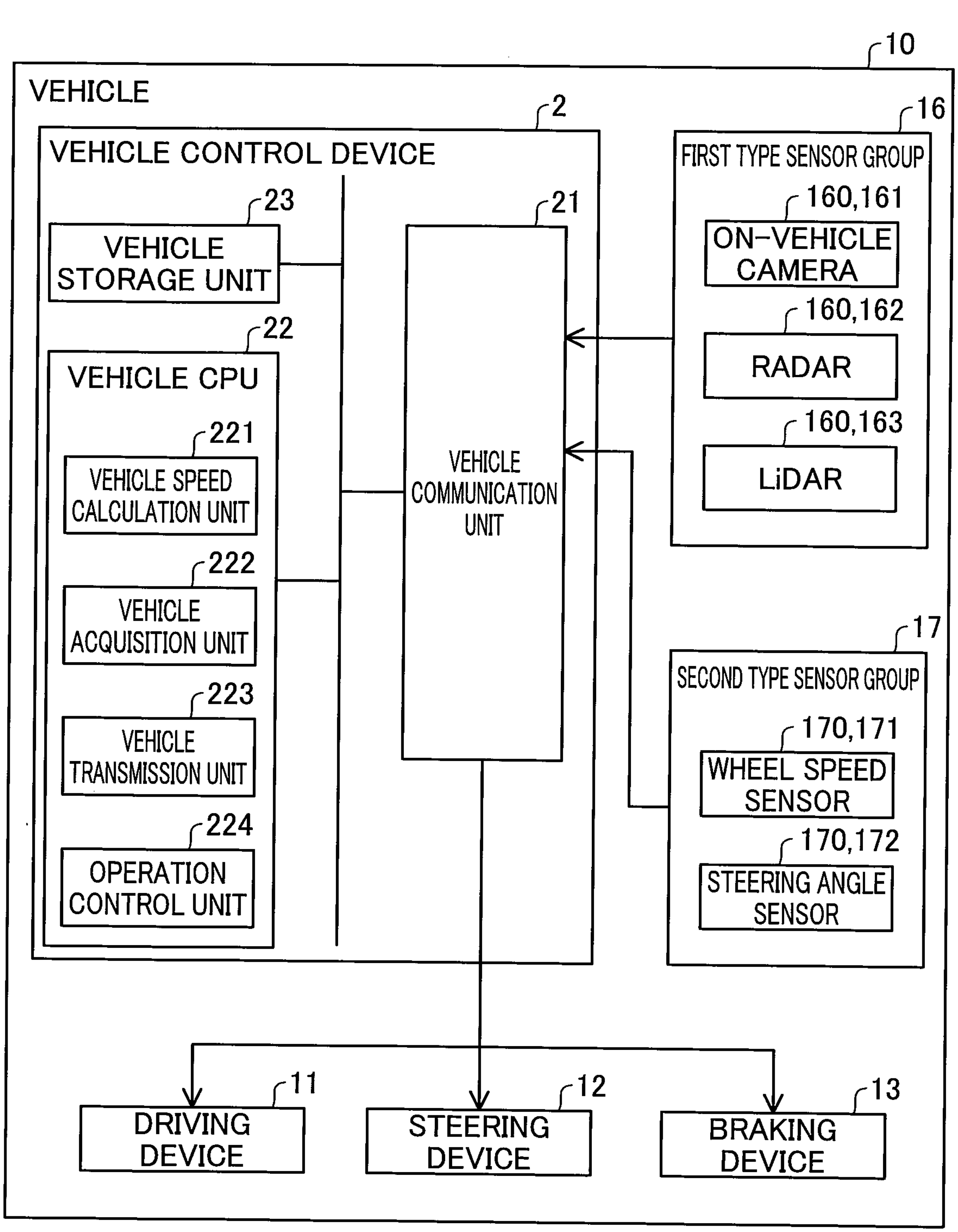
FIG. 2 illustrates a schematic structure of a vehicle.

FIG. 2 shows a schematic structure of the vehicle 10. FIG. 2 shows a part that represents the structure of the vehicle 10. The vehicle 10 includes a driving device 11, a steering device 12, a braking device 13, a first type sensor group 16 with a first type sensor 160, a second type sensor group 17 with a second type sensor 170, and a vehicle control device 2.

The driving device 11 accelerates the vehicle 10. For example, if the vehicle 10 is an electric vehicle, the driving device 11 has a battery (not shown), a motor (not shown) driven by electric power of the battery, and wheels (not shown) rotated by the motor.

The steering device 12 changes the traveling direction of the vehicle 10. The steering device 12 rotates the steering shaft (not shown) by torque from the steering motor (not shown) according to the control value received from the remote control device 5 so that the steering angle of the steering wheel (not shown) is consistent with the target steering angle of the wheels (not shown). This allows the steering device 12 to steer the wheels in the remote automatic driving mode without performing a steering operation.

The braking device 13 decelerates the vehicle 10. The braking device 13 is, for example, a disc brake device.

The first type sensor group 16 includes a plurality of types of first type sensors 160. The first type sensor 160 is a sensor that acquires surrounding information indicating the state of the surrounding area of the vehicle 10. The first type sensor 160 transmits the acquired data to the vehicle control device 2. In the present embodiment, the first type sensor group 16 includes, as the first type sensor 160, an on-vehicle camera 161, a radar 162, and a LIDAR 163.

The on-vehicle camera 161 acquires internal imaging information as imaging data by capturing an image of a range including at least a part of the surrounding area of the vehicle 10. The internal imaging information may be still image data or video data. Further, the internal imaging information may be color data or monochrome data.

The radar 162 emits a search wave (radio wave) to a predetermined search range and receives the reflected wave reflected by an object present in the surrounding area of the vehicle 10, thereby detecting the distance, angle, and relative speed, etc. with respect to the object in the surrounding area of the vehicle 10.

The LiDAR 163 emits a laser light to a predetermined measurement range and detects the reflected light reflected by an object present in the surrounding area of the vehicle 10, thereby detecting the distance, angle, and shape, etc. with respect to the object in the surrounding area of the vehicle 10. The structure of the first type sensor group 16 is not limited to that shown above.

The second type sensor group 17 includes a plurality of types of second type sensors 170. The second type sensor 170 is a sensor that acquires various physical quantities necessary to control the running operation of the vehicle 10. The second type sensor 170 transmits the acquired data to the vehicle control device 2. In the present embodiment, the second type sensor group 17 includes, as the second type sensor 170, a wheel speed sensor 171 and a steering angle sensor 172. The wheel speed sensor 171 measures the rotation rate (hereinafter referred to as "a wheel speed") of each wheel. The steering angle sensor 172 measures an actual steering angle of each wheel. The structure of the second type sensor group 17 is not limited to that shown above.

The vehicle control device 2 includes a vehicle communication unit 21 as the communication unit for the vehicle control device 2, a vehicle storage unit 23 as the storage unit for the vehicle control device 2, and a vehicle CPU 22 as the central processing unit for the vehicle control device 2. The vehicle communication unit 21, the vehicle storage unit 23, and the vehicle CPU 22 are connected to one another via an internal bus or interface circuit.

The vehicle communication unit 21 communicatively connects internal and external devices and the vehicle control device 2. The internal devices refer to devices mounted on the vehicle 10, such as the second type sensor 170 and first type sensor 160, that can communicate with the vehicle control device 2. The external devices refer to devices provided at a site different from the vehicle 10, such as the remote control device 5 and the imaging device 9. The vehicle communication unit 21 is, for example, a wireless communication device. The vehicle communication unit 21 communicates with the internal devices, for example, through CAN (Controller Area Network) communication. The CAN communication is a communication standard that allows transmission and reception in multiple directions. Further, the vehicle communication unit 21 communicates with the external devices, such as the remote control device 5 and the imaging device 9 connected to a network N, for example, via an access point (not shown) in the factory. The vehicle communication unit 21 may communicate with the vehicle control device 2 of another vehicle 10. The communication method used by the vehicle communication unit 21 is not limited to those shown above.

The vehicle storage unit 23 stores various types of information, including various programs that control the running operation of the vehicle 10. The vehicle storage unit 23 includes, for example, RAM, ROM, and a hard disk drive (HDD).

The vehicle CPU 22 functions as a vehicle speed calculation unit 221, a vehicle acquisition unit 222, a vehicle transmission unit 223, and an operation control unit 224 by expanding the various programs stored in the vehicle storage unit 23.

The vehicle speed calculation unit 221 calculates the running speed (hereinafter referred to as "a vehicle speed") of the vehicle 10 using the output value of the wheel speed sensor 171. The vehicle speed calculation unit 221 calculates the vehicle speed based on the wheel speed per unit time, for example, after calculations, such as averaging the wheel speed of each wheel, are performed. The method for calculating the vehicle speed is not limited to that described above. Further, at least some of the functions of the vehicle speed calculation unit 221 may be performed by the wheel speed sensor 171 or the remote control device 5.

The vehicle acquisition unit 222 acquires information (hereinafter referred to as "vehicle sensor information") including at least a part of the information acquired by the second type sensor 170 and the first type sensor 160, and the vehicle speed calculated by the vehicle speed calculation unit 221.

The vehicle transmission unit 223 transmits various types of information to external devices. For example, the vehicle transmission unit 223 transmits the vehicle sensor information to the remote control device 5, together with the vehicle identification information to identify the plurality of vehicles 10 from one another.

The operation control unit 224 receives the control values transmitted from the remote control device 5 and drives the driving device 11, the steering device 12, and the braking device 13 according to the received control values. In this way, the operation control unit 224 controls the running operation of the vehicle 10 in response to the instructions from the remote control device 5. At least some of the functions of the vehicle CPU 22 may be implemented as a function of the remote control device 5 or the imaging device 9.

Figure 3:
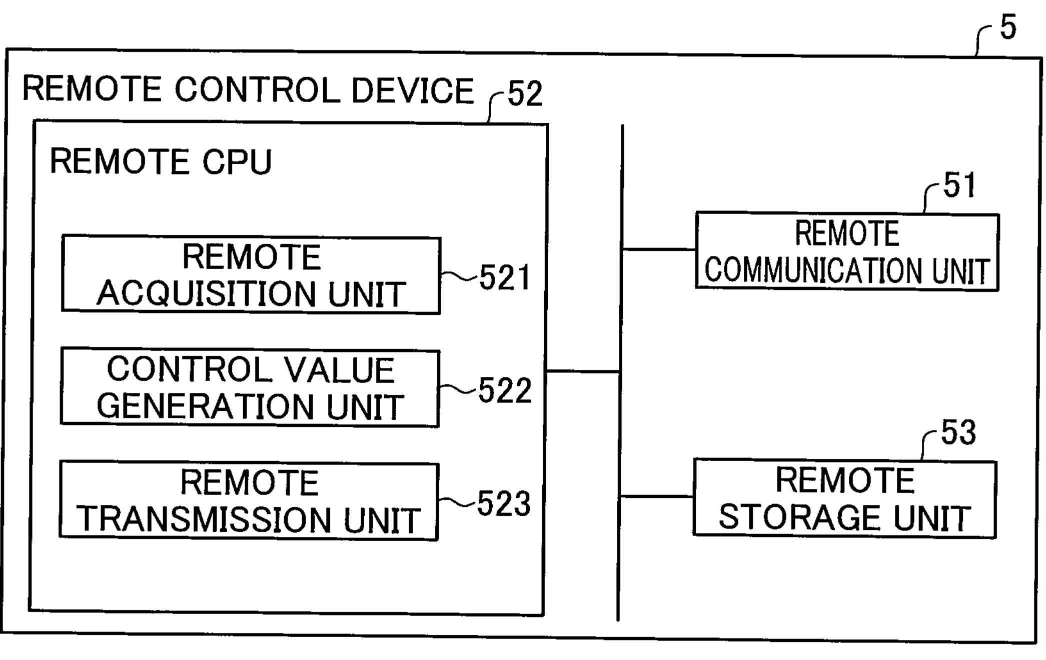
FIG. 3 illustrates a schematic structure of a remote control device.

FIG. 3 shows a schematic structure of the remote control device 5. The remote control device 5 includes a remote communication unit 51 as the communication unit for the remote control device 5, a remote storage unit 53 as the storage unit for the remote control device 5, and a remote CPU 52 as the central processing unit for the remote control device 5. The remote communication unit 51, the remote storage unit 53, and the remote CPU 52 are connected to one another via an internal bus or interface circuit.

The remote communication unit 51 communicatively connects the vehicle control device 2, the position estimation device 7 (server), and the imaging device 9 to the remote control device 5. The remote communication unit 51 is, for example, a wireless communication device. The communication method by the remote communication unit 51 is not limited to that shown above.

The remote storage unit 53 stores various types of information including various programs that control the operation of the remote control device 5. The remote storage unit 53 includes, for example, RAM, ROM, and a hard disk drive (HDD).

The remote CPU 52 functions as a remote acquisition unit 521, a control value generation unit 522, and a remote transmission unit 523 by expanding the various programs stored in the remote storage unit 53.

The remote acquisition unit 521 acquires information (hereinafter referred to as "running information") regarding running conditions of the vehicle 10. The running information includes, for example, captured images transmitted from the imaging device 9, vehicle coordinate points transmitted from the position estimation device 7 as information indicating the position of the vehicle 10, vehicle sensor information transmitted from the vehicle control device 2, and running route information stored in advance in the remote storage unit 53. The running route information is information indicating the target running route of the vehicle 10 that runs in the remote automatic driving mode. The type of information included in the running information is not limited to that described above.

The control value generation unit 522 generates a control value that defines the running operation of the vehicle 10 using the running information acquired by the remote acquisition unit 521. Specifically, the control value generation unit 522 generates a control value (hereinafter referred to as "a reference control value") that allows the vehicle 10 to run along the target running route. In the present embodiment, the reference control value includes a control value that defines the acceleration of the vehicle 10 in the forward direction (hereinafter referred to as "an acceleration control value") and a control value that defines the steering angle of the vehicle 10 (hereinafter referred to as "a steering angle control value"). The reference control value may include a control value (hereinafter referred to as "a direction control value") for switching the traveling direction of the vehicle 10 to either the forward direction or the backward direction, which is opposite to the forward direction. In alternative embodiments, the reference control value may include only the target running route. In this case, the operation control unit 224 of the vehicle control device 2 determines the acceleration, the steering angle, the traveling direction, and the like of the vehicle 10 based on the information regarding the target running route included in the reference control value, and drives the driving device 11, the steering device 12, and the braking device 13.

Further, the control value generation unit 522 generates a control value (hereinafter referred to as "a modified control value") that modifies the relative position of the vehicle 10 to the target running route. Specifically, the control value generation unit 522 calculates the actual running trajectory of the vehicle 10, for example, by arranging a plurality of images captured in different imaging ranges RG in chronological order. The control value generation unit 522 then compares the target running route with the actual running trajectory of the vehicle 10, and calculates the difference between the target running route and the running trajectory. Further, the control value generation unit 522 generates a modified control value for achieving the target running route, while analyzing the captured images so as to reduce the difference between the target running route and the actual running trajectory of the vehicle 10. In the present embodiment, the modified control value includes at least the steering angle control value. The modified control value may include the direction control value. In alternative embodiments, the modified control value may include only the corrected running route. The corrected running route is information indicating a running route on which the vehicle 10 should run in order to modify the relative position of the vehicle 10 to the target running route. In this case, the operation control unit 224 of the vehicle control device 2 determines the acceleration, the steering angle, the traveling direction, and the like of the vehicle 10 based on the information regarding the corrected running route included in the modified control value, and drives the driving device 11, the steering device 12, and the braking device 13.

The remote transmission unit 523 transmits the control value generated by the control value generation unit 522 to the vehicle 10 subjected to the control of running operation. The remote transmission unit 523 may transmit the control value to the vehicle 10 via the position estimation device 7 or the imaging device 9. When the remote transmission unit 523 transmits the control value to the vehicle 10 via the imaging device 9, the remote transmission unit 523 transmits the control value to the imaging device 9. The imaging device 9 then transmits the control value received from the remote control device 5 to the vehicle 10. This allows the vehicle 10 to receive the control value from an imaging device 9 closer to the vehicle 10. This makes the transmission less susceptible to communication failures. Therefore, it is possible to reduce the likelihood that the vehicle 10 running in the remote automatic driving mode may stop due to a communication failure. At least some of the functions of the remote CPU 52 may be implemented as a function of the vehicle control device 2 or the imaging device 9.

Figure 4:
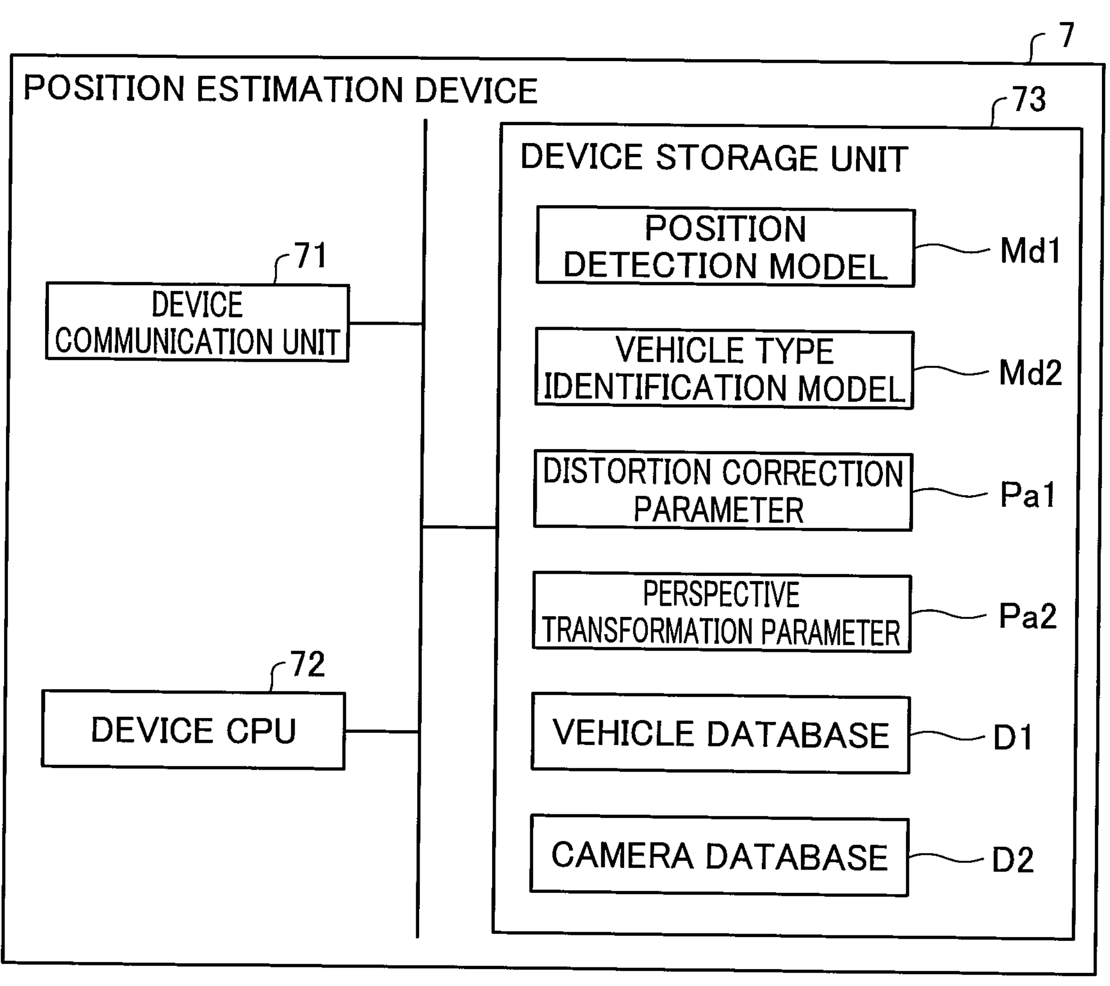
FIG. 4 illustrates a schematic structure of a position estimation device.

FIG. 4 illustrates a schematic structure of the position estimation device 7. The position estimation device 7, such as a server, uses the position of the predetermined positioning point 10*e* (FIG. 1) of the vehicle 10 as the position of the vehicle 10. The position estimation device 7 includes a device communication unit 71 as the communication unit for the position estimation device 7, a device storage unit 73 as the storage unit for the position estimation device 7, and a device CPU 72 as the central processing unit for the position estimation device 7. The device communication unit 71, the device storage unit 73, and the device CPU 72 are connected to one another via an internal bus or interface circuit. The position estimation device 7 may include a display device (not shown) that displays various types of information to the users. The display device is, for example, a liquid crystal display or an organic EL display.

The device communication unit 71 communicatively connects the vehicle control device 2, the remote control device 5, and the imaging device 9 to the position estimation device 7. The device communication unit 71 is, for example, a wireless communication device. The communication method by the device communication unit 71 is not limited to that shown above.

The device storage unit 73 stores various programs that control the operation of the position estimation device 7 and various type of information including a position detection model Md1, a vehicle type identification model Md2, a distortion correction parameter Pa1, and a perspective transformation parameter Pa2. In addition, the device storage unit 73 stores vehicle database D1 and camera database D2. The device storage unit 73 includes, for example, RAM, ROM, and a hard disk drive (HDD).

The position detection model Md1 is a trained machine learning model used to identify the position of the vehicle 10 included in a captured image. In the present embodiment, the position detection model Md1 is a machine learning model that has been trained by machine learning in advance to mask the vehicle 10 in the input image by inputting captured images or various images with various types of processing added to the captured images. The algorithm of the position detection model Md1 is, for example, a deep neural network (hereinafter referred to as "DNN") with the structure of a convolutional neural network (hereinafter referred to as "CNN") for implementing semantic segmentation or instance segmentation. An example of DNN used as an algorithm for the position detection model Md1 is a DNN that performs instance segmentation, such as YOLACT++. The structure of the position detection model Md1 is not limited to that shown above. The position detection model Md1 may be, for example, a trained machine learning model with an algorithm other than a neural network.

The vehicle type identification model Md2 is a trained machine learning model used to identify the vehicle type of the vehicle 10 included in a captured image. The vehicle type of the vehicle 10 here means, for example, the type of the vehicle 10 classified by vehicle name or vehicle model code. The vehicle type identification model Md2 is a machine learning model that has been trained by machine learning in advance to output information indicating the vehicle type of the vehicle 10 in the input image by inputting captured images or various images with various types of processing added to the captured images. The vehicle type identification model Md2 has learned feature quantity according to the type of the vehicle 10 so as to identify the type of the vehicle 10. The feature quantity according to the type of the vehicle 10 is, for example, the shape of the vehicle 10 and the vehicle class determined by the overall length, width, and height of the vehicle 10. In the present embodiment, the vehicle type identification model Md2 outputs vehicle type identification information as information indicating the type of the vehicle 10 in the input image. The vehicle type identification information is a unique ID (identifier) assigned to each of the plurality of types of the vehicles 10 to identify them one another, and there is no overlap of vehicle type identification information among the vehicle types. For example, CNN is used as the algorithm of the vehicle type identification model Md2. The structure of the vehicle type identification model Md2 is not limited to that shown above. The vehicle type identification model Md2 may be, for example, a trained machine learning model with an algorithm other than a neural network.

The distortion correction parameter Pa1 is a parameter used to modify the distortion of captured images. The perspective transformation parameter Pa2 is a parameter used for perspective transformation of a first mask image. The details of the correction parameter Pa1 and the perspective transformation parameter Pa2 are described later.

The vehicle database D1 is information indicating the vehicle parameter for each type of the vehicle 10. The vehicle parameter is a parameter that is determined based on the type of the vehicle 10. The vehicle parameter is, for example, a parameter regarding the distance from a reference point (e.g., the road surface 60 or road boundary) on the track of the vehicle 10 to the positioning point 10*e* of the vehicle 10. In the present embodiment, the vehicle database D1 is a database in which the vehicle type identification information is associated with the vehicle parameter for the type of the vehicle 10 identified by the vehicle type identification information.

The camera database D2 is information indicating an imaging parameter, which is calculated based on the position of the imaging device 9 in the global coordinate system, for each of the imaging device 9. In the present embodiment, the camera database D2 is a database in which the camera identification information is associated with the imaging parameter for the imaging device 9 identified by the camera identification information. The imaging parameter is calculated based on the position of the imaging device 9 in the global coordinate system. At least some of the various types of information stored in the device storage unit 73 may be stored in the storage units of other devices (e.g., storage units of the vehicle storage unit 23, the remote storage unit 53, and the imaging device 9).

Figure 5:
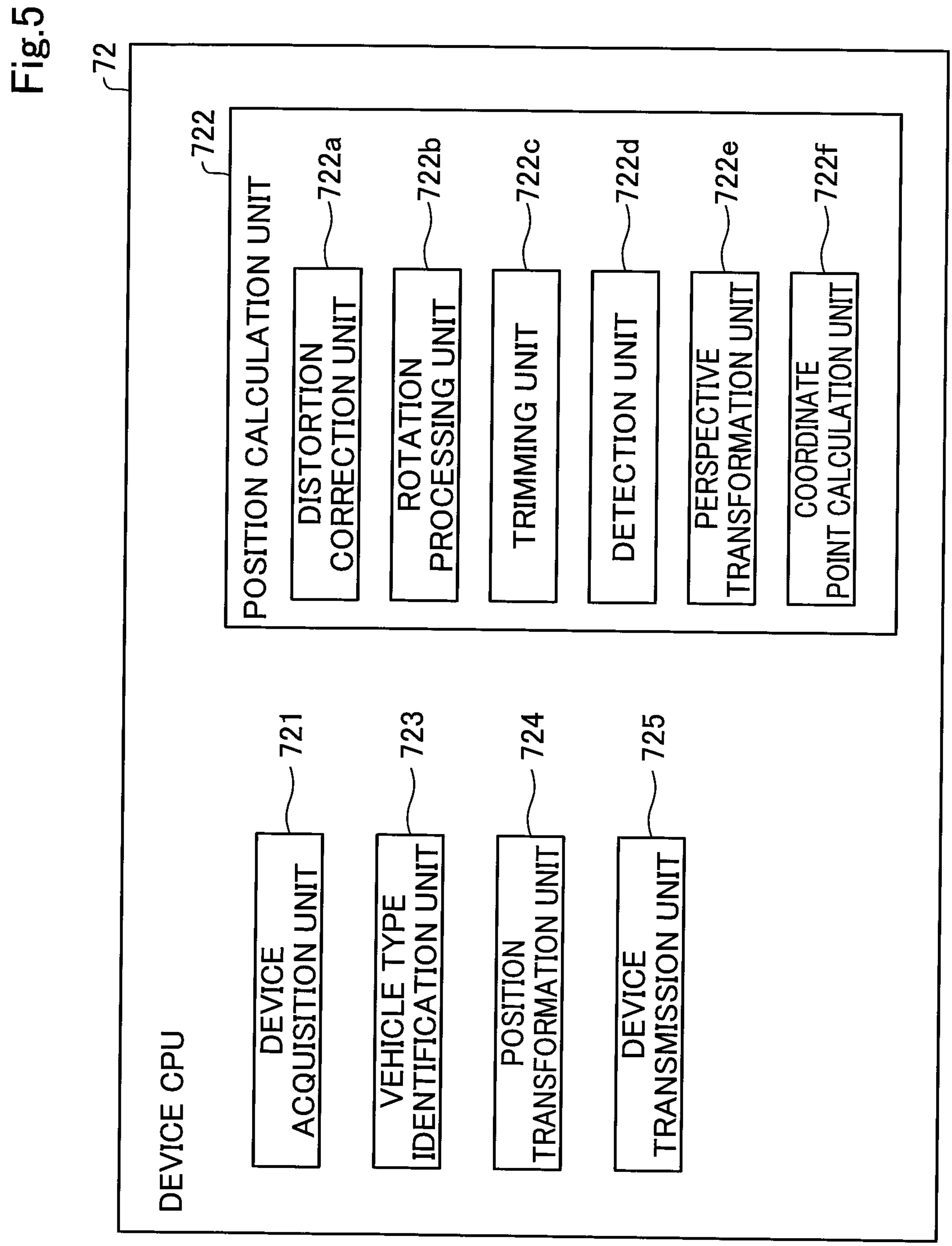
FIG. 5 illustrates details of a device CPU in a first embodiment.

FIG. 5 illustrates details of the device CPU 72 in the first embodiment. The device CPU 72 functions as a device acquisition unit 721 and a position calculation unit 722 by expanding various programs stored in the device storage unit 73. Further, the device CPU 72 functions as a vehicle type identification unit 723 as a type identification unit, a position transformation unit 724, and a device transmission unit 725 by expanding various programs stored in the device storage unit 73.

The device acquisition unit 721 acquires various types of information. For example, the device acquisition unit 721 acquires a captured image Im1 including the vehicle 10 from the imaging device 9. The device acquisition unit 721 acquires a vehicle parameter according to the type of the vehicle 10 identified by the vehicle type identification unit 723 by referring to the vehicle database D1 stored in advance in the device storage unit 73. The device acquisition unit 721 acquires an imaging parameter for the imaging device 9 from which the captured image to be analyzed was acquired by referring to the camera database D2 stored in advance in the device storage unit 73. The type of the information acquired by the device acquisition unit 721 is not limited to that described above.

The position calculation unit 722 calculates local coordinate points using the captured images. The local coordinate point is a coordinate point indicating the position of the vehicle 10 in the local coordinate system, which is described later. The position calculation unit 722 includes a distortion correction unit 722*a*, a rotation processing unit 722*b*, a trimming unit 722*c*, a detection unit 722*d*, a perspective transformation unit 722*e*, and a coordinate point calculation unit 722*f*.

The distortion correction unit 722*a* generates a modified image in which the distortion of the captured image is modified. The rotation processing unit 722*b* generates a rotated image obtained by rotating the modified image so that the vector indicating the movement direction of the vehicle 10 (hereinafter referred to as "a movement vector") faces the predetermined direction. The trimming unit 722*c* deletes regions (hereinafter referred to as "unnecessary region") other than the vehicle region corresponding to the vehicle 10 and the predetermined area surrounding the vehicle 10 (hereinafter referred to as "necessary region") from each region of the rotated image, thereby generating a processed image in which the necessary region including the vehicle region and the surrounding area are cut out. In the present embodiment, when the vehicle 10 has moved a distance exceeding a predetermined threshold, the trimming unit 722*c* deletes a post-movement region (unnecessary region), which is a post-movement region corresponding to the distance that the vehicle 10 has moved, from the rotated image. In this way, the trimming unit 722*c* generates a processed image that is obtained by cutting out a pre-movement region (necessary region) including the vehicle 10 from the rotated image. The detection unit 722*d* detects the vehicle 10 included in the processed image using the position detection model Md1 and generates the first mask image with a mask region in which the vehicle 10 in the processed image is masked. The perspective transformation unit 722*e* generates a second mask image by performing perspective transformation of the first mask image. The coordinate point calculation unit 722*f* corrects a first coordinate point using a second coordinate point, thereby calculating the local coordinate point. The first coordinate point is a coordinate point in the local coordinate system of the specified vertex of a first bounding rectangle set in the mask region in the first mask image. The second coordinate point is a coordinate point in the local coordinate system of a vertex that indicates the same position as the first coordinate point from among the vertices of a second bounding rectangle set in the mask region in the second mask image. The structure of the position calculation unit 722 is not limited to that shown above.

The vehicle type identification unit 723 identifies the type of the vehicle 10 included in the captured image. In the present embodiment, the vehicle type identification unit 723 identifies the type of the vehicle 10 using the vehicle type identification model Md2.

The position transformation unit 724 transforms the local coordinate point into the vehicle coordinate point (moving object coordinate point) using the imaging parameter and the vehicle parameter acquired by the device acquisition unit 721. The vehicle coordinate point is a coordinate point that indicates the position of the vehicle 10 in the global coordinate system. That is, the position transformation unit 724 calculates the vehicle coordinate point using the imaging parameter for the imaging device 9 from which the captured image acquired by the device acquisition unit 721 was captured and the vehicle parameter (moving object parameter) for the type of the vehicle 10 identified by the vehicle type identification unit 723.

The device transmission unit 725 transmits the vehicle coordinate point to the remote control device 5 as information indicating the position of the vehicle 10. The device transmission unit 725 may transmit various types of information other than the vehicle coordinate point to the remote control device 5. Further, the device transmission unit 725 may also transmit various types of information to the vehicle control device 2. At least some of the functions of the device CPU 72 may be implemented as a function of the remote control device 5, the vehicle control device 2, or the imaging device 9.

A-2. Vehicle Operation Control Method

Figure 6A:
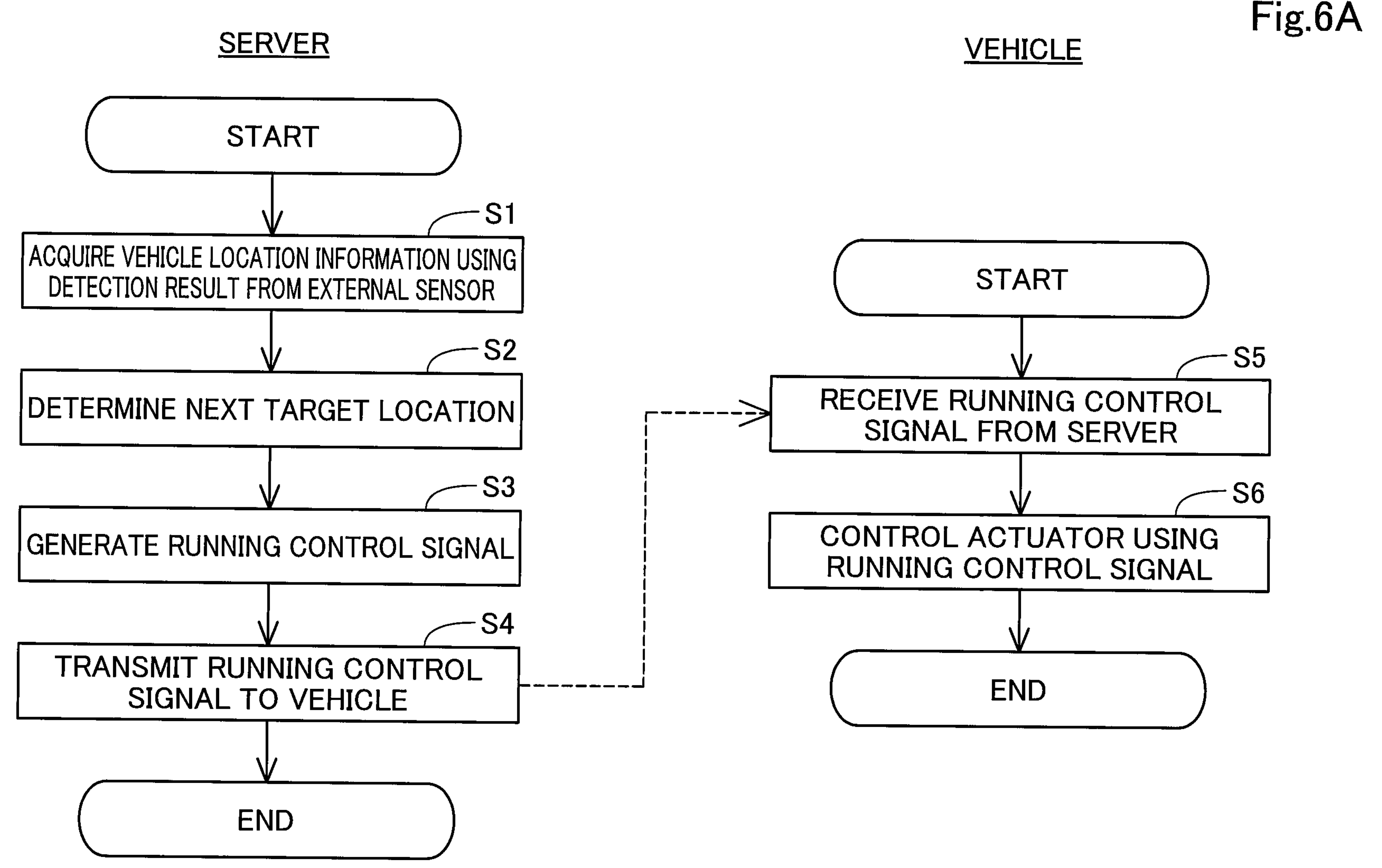
FIG. 6A is a flowchart of procedures in a process of running control of a vehicle in the first embodiment.

Before specifically describing the operation control method for the vehicle 10, the running control for the vehicle 10 in the first embodiment is described below with reference to FIG. 6A. FIG. 6A is a flowchart of procedures in the process of running control of the vehicle 10 in the first embodiment.

In step S1, the remote control device 5 as a server acquires vehicle location information using detection result output from an external sensor. The external sensor is located outside the vehicle 10. The vehicle location information is locational information as a basis for generating a running control signal. In the present embodiment, the vehicle location information includes the location and orientation of the vehicle 10 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is a camera that is disposed in the factory and outputs a captured image as detection result. In step S1, the remote control device 5 acquires the vehicle location information using the captured image acquired from the imaging device 9 as the external sensor.

More specifically, in step S1, the remote control device 5 for example, determines the outer shape of the vehicle 10 from the captured image, calculates the coordinates of a positioning point of the vehicle 10 in a coordinate system of the captured image, namely, in a local coordinate system, and converts the calculated coordinates to coordinates in the global coordinate system, thereby acquiring the location of the vehicle 10. The outer shape of the vehicle 10 in the captured image may be detected by inputting the captured image to a detection model using artificial intelligence, for example. The detection model is prepared in the position estimation system 1 or outside the position estimation system 1. The detection model is stored in advance in a remote storage unit 53 as a memory of the remote control device 5, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 10, and a label showing whether each region in the training image is a region indicating the vehicle 10 or a region indicating a subject other than the vehicle 10, for example. In training the CNN, a parameter for the CNN is preferably updated through backpropagation in such a manner as to reduce error between output result obtained by the detection model and the label. The remote control device 5 can acquire the orientation of the vehicle 10 through estimation based on the direction of a motion vector of the vehicle 10 detected from change in location of a feature point of the vehicle 10 between frames of the captured images using optical flow process, for example.

In step S2, the remote control device 5 determines a target location to which the vehicle 10 is to move next. In the present embodiment, the target location is expressed by X, Y, and Z coordinates in the global coordinate system. The memory of the remote control device 5 contains a reference route stored in advance as a route along which the vehicle 10 is to run. The route is expressed by a node indicating a departure place, a node indicating a way point, a node indicating a destination, and a link connecting nodes to each other. The remote control device 5 determines the target location to which the vehicle 10 is to move next using the vehicle location information and the reference route. The remote control device 5 determines the target location on the reference route ahead of a current location of the vehicle 10.

In step S3, the remote control device 5 generates a running control signal for causing the vehicle 10 to run toward the determined target location. In the present embodiment, the running control signal includes an acceleration and a steering angle of the vehicle 10 as parameters. The remote control device 5 calculates a running speed of the vehicle 10 from transition of the location of the vehicle 10 and makes comparison between the calculated running speed and a target speed of the vehicle 10 determined in advance. If the running speed is lower than the target speed, the remote control device 5 generally determines an acceleration in such a manner as to accelerate the vehicle 10. If the running speed is higher than the target speed as, the remote control device 5 generally determines an acceleration in such a manner as to decelerate the vehicle 10. If the vehicle 10 is on the reference route, remote control device 5 determines a steering angle and an acceleration in such a manner as to prevent the vehicle 10 from deviating from the reference route. If the vehicle 10 is not on the reference route, in other words, if the vehicle 10 deviates from the reference route, the remote control device 5 determines a steering angle and an acceleration in such a manner as to return the vehicle 10 to the reference route. In other embodiments, the running control signal may include the speed of the vehicle 10 as a parameter instead of or in addition to the acceleration of the vehicle 10.

In step S4, the remote control device 5 transmits the generated running control signal to the vehicle 10. The remote control device 5 repeats the acquisition of vehicle location information, the determination of a target location, the generation of a running control signal, the transmission of the running control signal, and others in a predetermined cycle.

In step S5, the driving controller of the vehicle 10 receives the running control signal transmitted from the remote control device 5. In step S6, the vehicle 10 controls an actuator of the vehicle 10 using the received running control signal, thereby causing the vehicle 10 to run at the acceleration and the steering angle indicated by the running control signal. The vehicle 10 repeats the reception of a running control signal and the control over the actuator in a predetermined cycle. According to the position estimation system 1 in the present embodiment, it becomes possible to move the vehicle 10 without using a transport unit such as a crane or a conveyor.

FIG. 6B is a flowchart of a first operation control method. The first operation control method is a method for controlling the running operation of the vehicle 10 in order to initiate running of the vehicle 10 in the remote automatic driving mode.

When the preparation to start running in the remote automatic driving mode is completed (step S101: Yes), the vehicle transmission unit 223 of the vehicle 10 transmits a preparation completion signal to the remote control device 5 (step S102).

When the remote acquisition unit 521 of the remote control device 5 receives the preparation completion signal (step S103: Yes), the remote acquisition unit 521 acquires the running information (step S104). The running information here includes at least running route information indicating the target running route. After the step S104, the control value generation unit 522 generates a reference control value as a running control signal using the running information (step S105). After the step S105, the remote transmission unit 523 transmits the reference control value generated by the control value generation unit 522 to the vehicle 10 (step S106).

When the operation control unit 224 of the vehicle 10 receives the reference control value (step S107: Yes), the operation control unit 224 sets the running route of the vehicle 10 to the target running route and starts running in the remote automatic driving mode (step S108). That is, the operation control unit 224 drives the driving device 11, the steering device 12, and the braking device 13 mounted on the vehicle 10 so that the vehicle 10 runs along the target running route.

Figure 7:
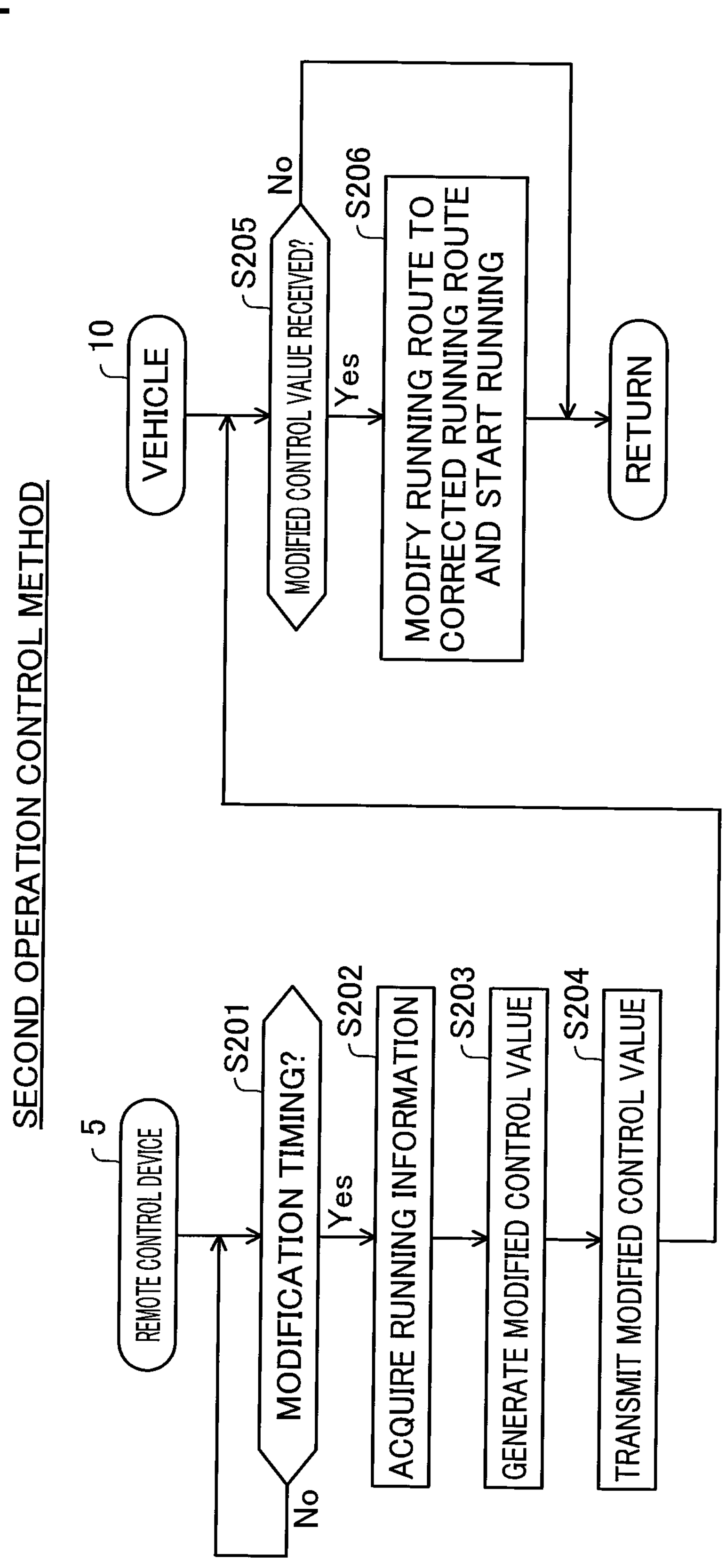
FIG. 7 is a flowchart of a second operation control method.

FIG. 7 is a flowchart of a second operation control method. The second operation control method is a method for modifying the running route of the vehicle 10 that is running in the remote automatic driving mode. The second operation control method is executed after the first operation control method shown in FIG. 6 is completed.

As shown in FIG. 7, when the predetermined modification timing comes (step S201: Yes), the remote acquisition unit 521 of the remote control device 5 acquires the running information (step S202). The modification timing is, for example, the timing when the elapsed time after the start of the running in the remote automatic driving mode becomes equal to or more than a predetermined time period, or the timing when a predetermined time has passed after the previous modification timing. The running information here includes at least the running route information indicating the target running route and the vehicle coordinate point. After the step S202, the control value generation unit 522 generates a modified control value using the running information (step S203). After the step S203, the remote transmission unit 523 transmits the modified control value as the running control signal generated by the control value generation unit 522 to the vehicle 10 (step S204).

If the operation control unit 224 of the vehicle 10 receives the modified control value (step S205: Yes), the operation control unit 224 modifies the running route of the vehicle 10 to the corrected running route according to the modified control value, and continues running in the remote automatic driving mode (step S206). That is, the operation control unit 224 drives the driving device 11, the steering device 12, and the braking device 13 mounted on the vehicle 10 so that the vehicle 10 runs along the corrected running route. When the step S206 is completed, the process returns to the step S201, and each step from the step S201 to the step S206 is performed repeatedly.

A-3. Vehicle Position Estimation Method

Figure 8:
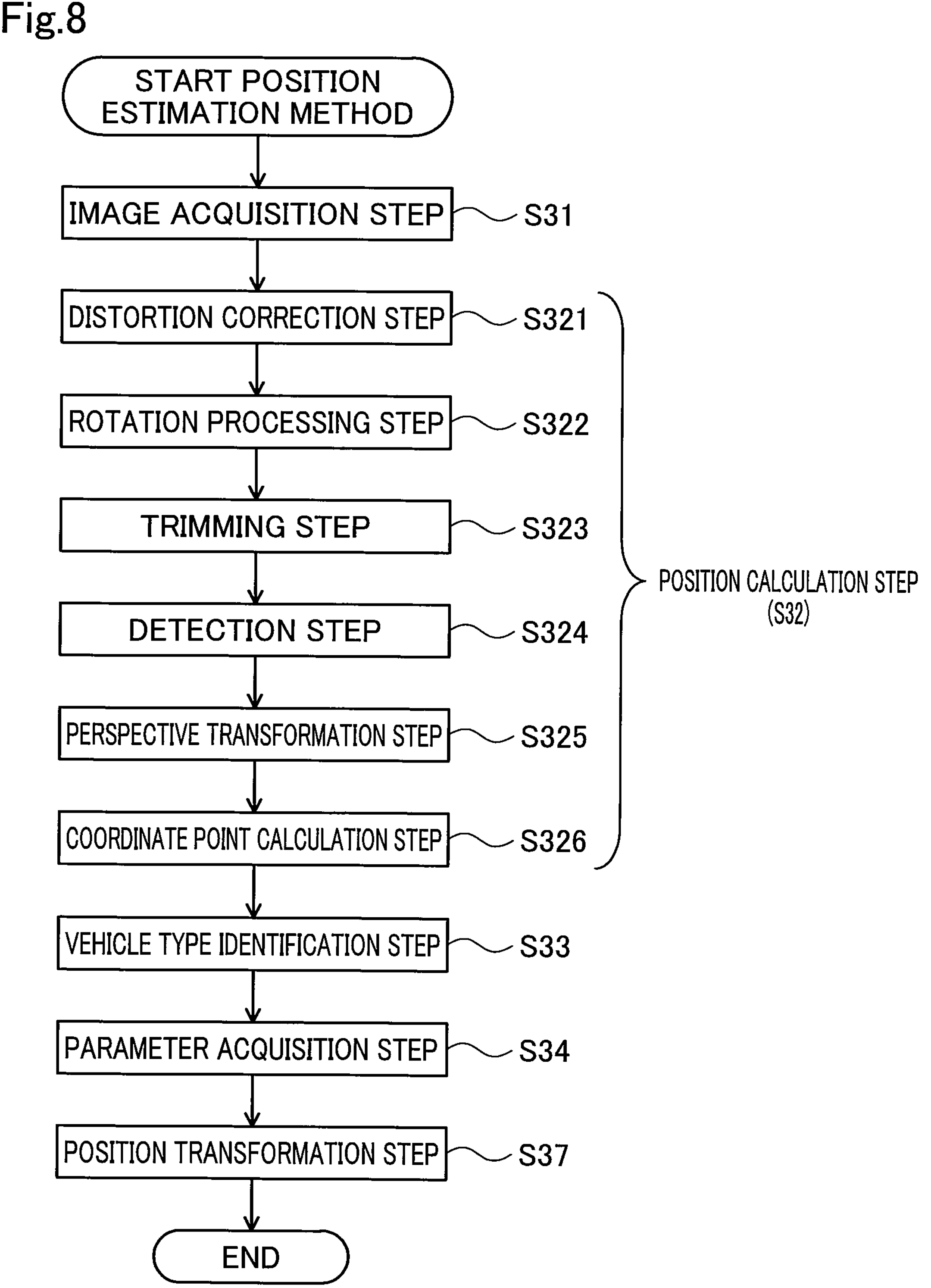
FIG. 8 is a flowchart of a vehicle position estimation method in the first embodiment.

FIG. 8 is a flowchart of a position estimation method for the vehicle 10 in the first embodiment. The position of the vehicle 10 estimated by the position estimation method is transmitted to the remote control device 5 as one of the running information and is used to generate control values as running control signals to control the running operation of the vehicle 10. Therefore, the position estimation method is performed, for example, before the second operation control method shown in FIG. 7 is started. That is, the position estimation method is performed at the timing when the vehicle coordinate point indicating the position of the vehicle 10 can be provided as one of the running information from the position estimation device 7 to the remote control device 5 in the step S202 of the second operation control method.

Figure 9:
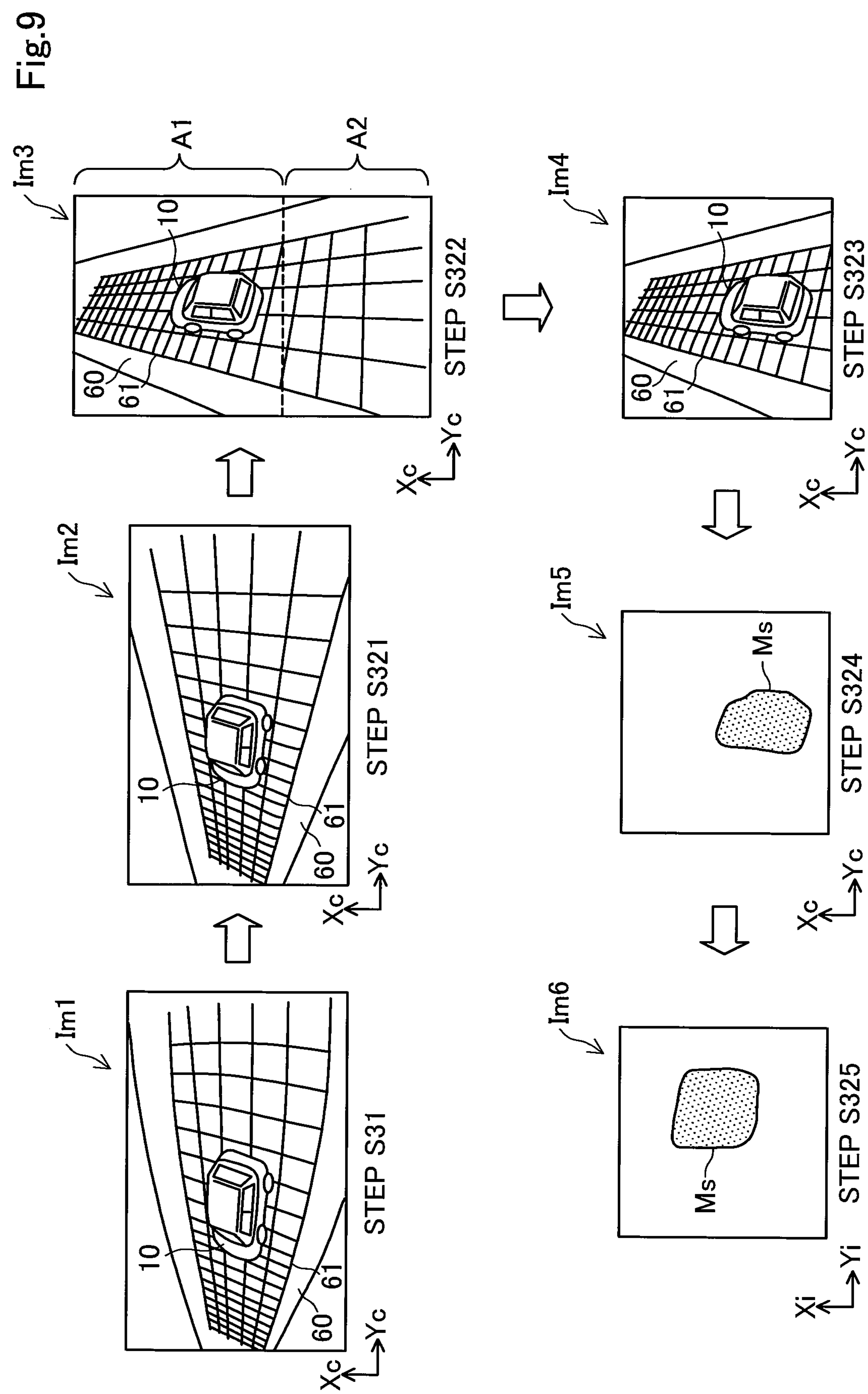
FIG. 9 is a schematic diagram illustrating examples of various images.

FIG. 9 is a schematic diagram illustrating examples of various images when the position estimation method shown in FIG. 8 is performed. In FIG. 9, each step of FIG. 8 is labelled with a corresponding step number. The present embodiment describes an exemplary case in which the vehicle 10 moves (runs) along the traveling direction on the road surface 60 on which a mesh-like grid line 61 is drawn along each of the Xg axis parallel to the traveling direction of the vehicle 10 and the Yg axis, which is orthogonal to the Xg axis. Each of the Xg and Yg axes is a coordinate axis of the global coordinate system. In the alternative embodiments, the grid line 61 may be omitted.

In the position estimation method, an image acquisition step (step S31) is performed first. The image acquisition step is a step of acquiring the captured image Im1 that includes the vehicle 10 subjected to the position estimation. In the image acquisition step, the device acquisition unit 721 acquires the captured image Im1 acquired by the imaging device 9.

After the image acquisition step, a position calculation step (step S32) is performed. The position calculation step is a step of calculating the local coordinate point using the captured image Im1 acquired in the image acquisition step.

In the position calculation step, a distortion correction step (step S321) is performed first. The distortion correction step is a step of correcting the distortion of the captured image Im1. In the distortion correction step, the distortion correction unit 722*a* corrects the distortion of the captured image Im1 to generate a modified image Im2. Specifically, the distortion correction unit 722*a* corrects distortions in the captured image Im1, for example, using the distortion correction parameter Pa1 stored in advance in the device storage unit 73. The distortion correction parameter Pa1 is, for example, a parameter related to the position information of the grid line 61 that can be obtained by calibration. The method for correcting distortions is not limited to that described above. The distortion correction parameter Pa1 may be any parameter other than the grid line 61.

After the distortion correction step, a rotation processing step (step S322) is performed. The rotation processing step is a step of rotating the modified image Im2 so that the direction of the movement vector for the vehicle 10 included in the modified image Im2 faces the predetermined direction. In the rotation processing step, the rotation processing unit 722*b* rotates the modified image Im2 so that the direction of the movement vector for the vehicle 10 included in the modified image Im2 faces the predetermined direction. In this way, the rotation processing unit 722*b* generates a rotated image Im3. Specifically, the rotation processing unit 722*b* rotates the modified image Im2 using the center of gravity of the vehicle 10 in the modified image Im2 as the rotation center so that, for example, the direction of the movement vector of the vehicle 10 faces upward on the screen of the display device (not shown) that displays the modified image Im2. The movement of the feature point (center of gravity) of the vehicle 10 can be expressed as a direction of the movement vector, for example, by the optical flow method. The amount and the direction of the movement vector of the vehicle 10 are estimated, for example, based on changes in position between the image frames of the feature points of the vehicle 10 that are appropriately set on the modified image Im2. The rotation processing method is not limited to that described above.

After the rotation processing step, a trimming step (step S323) is performed. The trimming step is a step of generating a processed image Im4 including the target region from the rotated image Im3. In the present embodiment, in the trimming step, when the vehicle 10 has moved a distance exceeding a predetermined threshold, the trimming unit 722*c* deletes a post-movement region A2 corresponding to the distance the vehicle 10 has moved as an unnecessary region from the rotated image Im3. In this way, the trimming unit 722*c* generates the processed image Im4 in which the pre-movement region A1 including the vehicle 10 is cut out as the target region from the rotated image Im3. The trimming unit 722*c* estimates the post-movement region A2 by, for example, recognizing the distance the vehicle 10 has moved based on the estimated amount of the movement vector of the vehicle 10. In the position calculation step, any of the rotation processing step and the trimming step may be performed first. Further, the trimming method is not limited to that described above.

As shown in FIG. 8, a detection step (step S324) is performed after the trimming step. The detection step is a step of detecting the outer shape (outline) of the vehicle 10 included in the processed image Im4 using the position detection model Md1. In the detection step, the detection unit 722*d* inputs the processed image Im4 to the position detection model Md1. As a result, as shown in FIG. 9, the detection unit 722*d* detects the vehicle 10 included in the processed image Im4, and generates a first mask image Im5 with a mask region Ms in which the vehicle 10 in the processed image Im4 is masked. The method for detecting the outer shape of the vehicle 10 is not limited to that described above.

As shown in FIG. 8, a perspective transformation step (step S325) is performed after the detection step. The perspective transformation step is a step of performing perspective transformation of the first mask image Im5 shown in FIG. 9. In the perspective transformation step, the perspective transformation unit 722*e* generates a second mask image Im6 by subjecting the first mask image Im5 to perspective transformation. Specifically, the perspective transformation unit 722*e* performs perspective transformation with respect to the first mask image Im5 to generate a bird's-eye view image that is viewed from a viewpoint above the vehicle 10 (e.g., directly above the vehicle 10) that is substantially perpendicular to the road surface 60, for example, using the perspective transformation parameter Pa2 that is stored in advance in the device storage unit 73. The perspective transformation parameter Pa2 is, for example, a parameter related to the position information and internal parameter of the imaging device 9 obtained by calibration. As a result, the perspective transformation unit 722*e* generates a second mask image Im6 represented by the local coordinate system from the first mask image Im5 represented by the camera coordinate system. The local coordinate system is a coordinate system having one point in the image plane projected by perspective transformation as the origin, with the coordinate axes represented by the Xi axis and the Yi axis, which is orthogonal to the Xi axis. The perspective transformation method is not limited to that described above. The perspective transformation parameter Pa2 may be any parameter other than that described above.

Figure 10:
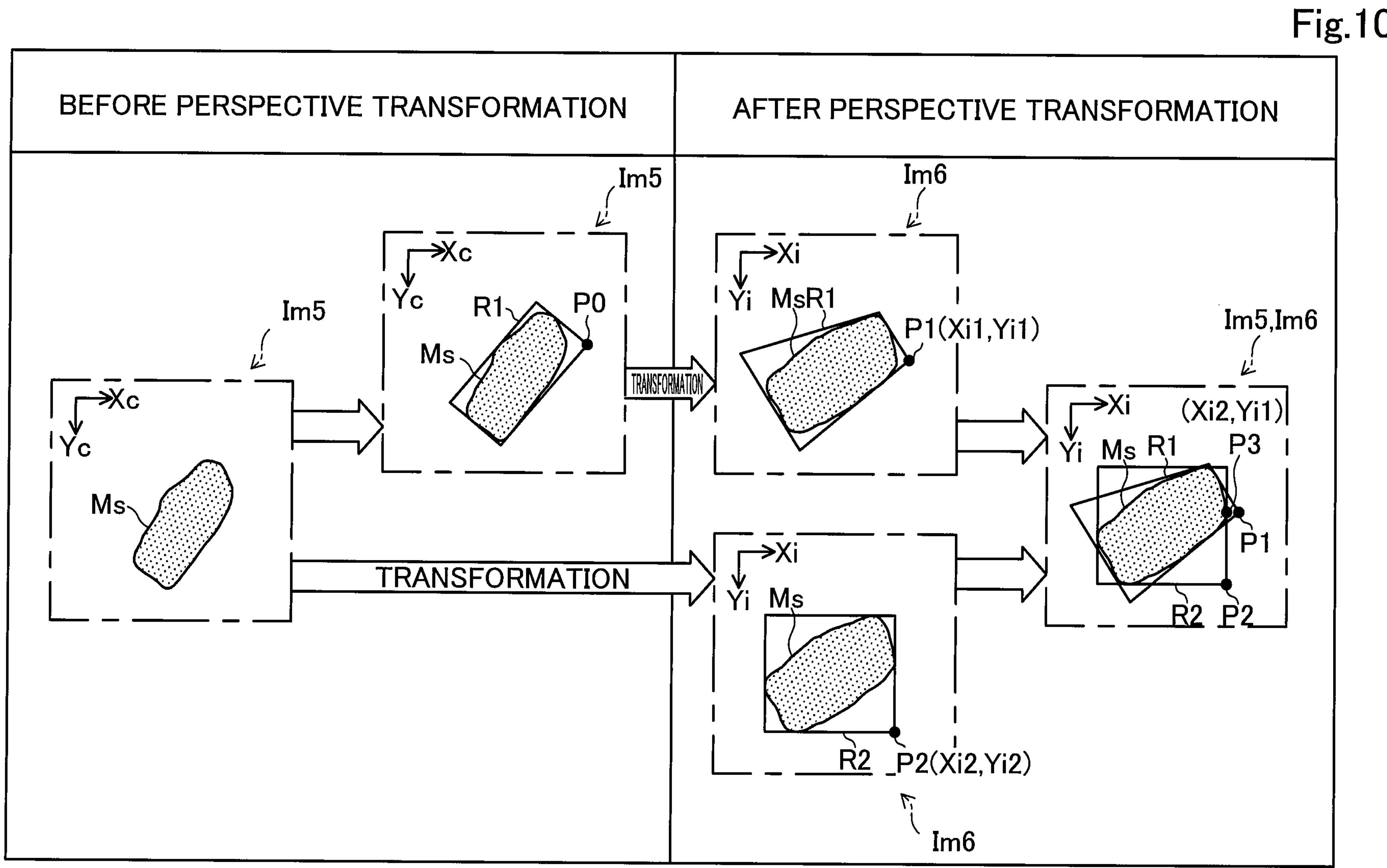
FIG. 10 is a diagram for explaining details of a coordinate point calculation step.

As shown in FIG. 8, after the perspective transformation step, a coordinate point calculation step (step S326) is performed. FIG. 10 is a diagram for explaining details of the coordinate point calculation step. The coordinate point calculation step is a step of calculating a local coordinate point P3.

Figure 11:
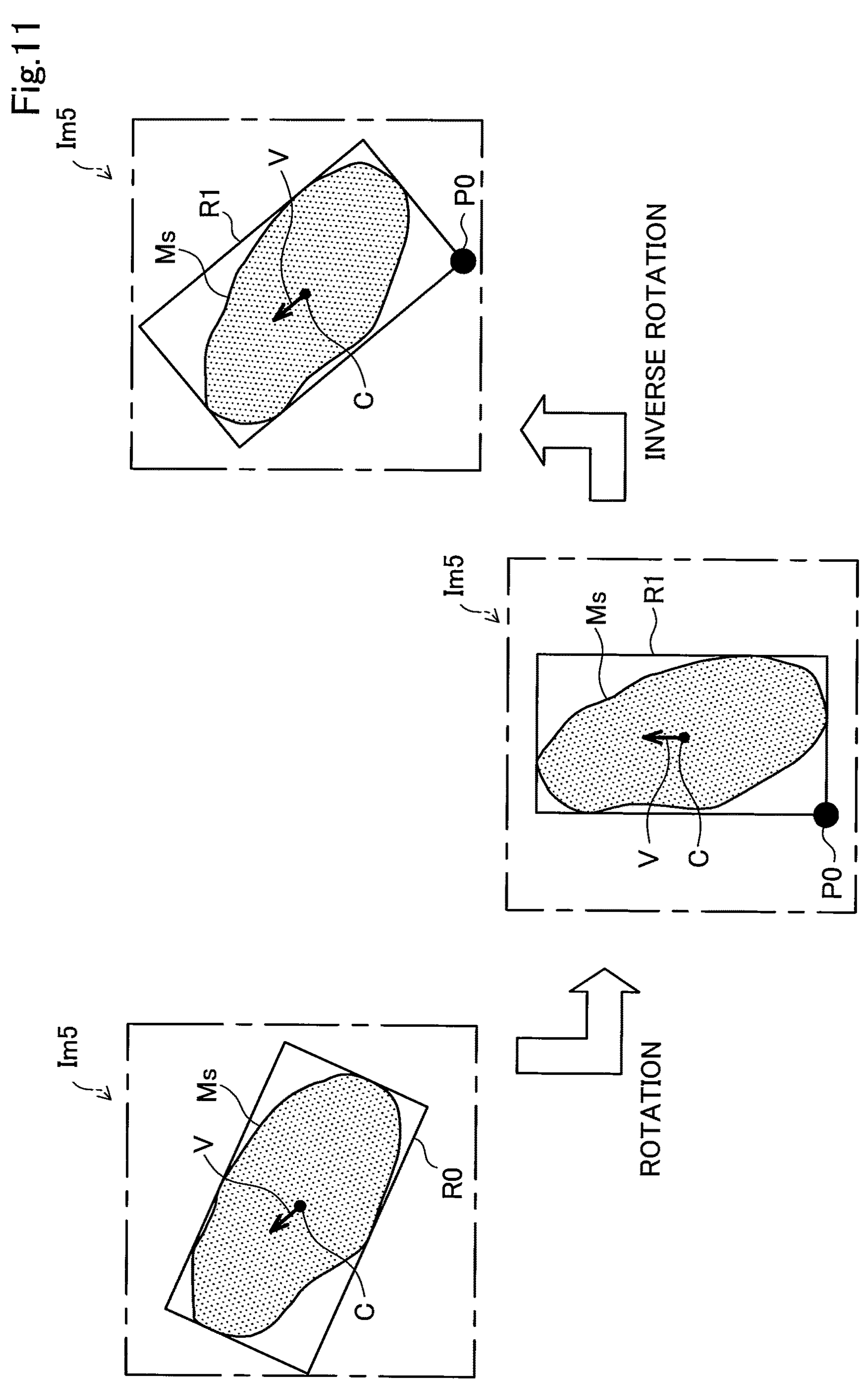
FIG. 11 is a diagram for explaining a method for acquiring base coordinate points.

In the coordinate point calculation step, the coordinate point calculation unit 722*f* first acquires a base coordinate point P0 from a first bounding rectangle R1 set in the mask region Ms in the first mask image Im5, which is the image before the perspective transformation. FIG. 11 is a diagram for explaining a method for acquiring the base coordinate point P0. To acquire the base coordinate point P0, the coordinate point calculation unit 722*f* first sets the base bounding rectangle R0 with respect to the mask region Ms in the first mask image Im5. Next, the coordinate point calculation unit 722*f* rotates the first mask image Im5 by the required amount of rotation with the center of gravity C of the mask region Ms as the rotation center so that the direction of the movement vector V of the vehicle 10 corresponding to the mask region Ms in the first mask image Im5 faces the predetermined direction. The predetermined direction is, for example, the upward direction on the screen of the display device (not shown). Next, the coordinate point calculation unit 722*f* sets the first bounding rectangle R1 with respect to the mask region Ms of the rotated first mask image Im5 so that the long side thereof becomes parallel to the direction of the movement vector V. Next, the coordinate point calculation unit 722*f* inversely rotates the first mask image Im5 to which the first bounding rectangle R1 is added, with the center of gravity C of the mask region Ms as the rotation center, by the above rotation amount. The coordinate point calculation unit 722*f* thus acquires, as the base coordinate point P0, the coordinate point of the vertex that is one of the four vertices of the first bounding rectangle R1 and that has the coordinates with the closest distance to the positioning point 10*e* of the vehicle 10. Then, as shown in FIG. 10, the coordinate point calculation unit 722*f* performs perspective transformation with respect to the inversely rotated first mask image Im5, i.e., the first mask image Im5 after the acquisition of the base coordinate point P0. In this way, the coordinate point calculation unit 722*f* acquires a first coordinate point P1 as the coordinate point corresponding to the base coordinate point P0 in the first bounding rectangle R1 deformed by the perspective transformation.

Further, the coordinate point calculation unit 722*f* sets the second bounding rectangle R2 with respect to the mask region Ms in the second mask image Im6 obtained by perspective transformation of the first mask image Im5. Then, the coordinate point calculation unit 722*f* acquires, as the second coordinate point P2, a vertex that indicates the same position as the first coordinate point P1 from among the vertices of the second bounding rectangle R2. Specifically, the coordinate point calculation unit 722*f* acquires, as the second coordinate point P2, the vertex that is one of the four vertices of the second bounding rectangle R2 and that has the coordinates with the closest distance to the positioning point 10*e* of the vehicle 10. In other words, the first coordinate point P1 and the second coordinate point P2 are correlated with each other, as they are coordinate points indicating the same position.

Furthermore, the coordinate point calculation unit 722*f* performs a correction to replace the coordinates (Xi1, Yi1) of the first coordinate point P1 with the coordinates (Xi2, Yi2) of the second coordinate point P2 according to the relative magnitude between the coordinate values of the first coordinate point P1 and the second coordinate point P2. When the coordinate value Xi1 in the Xi-axis direction of the first coordinate point P1 is greater than the coordinate value Xi2 in the Xi-axis direction of the second coordinate point P2 (Xi1>Xi2), the coordinate point calculation unit 722*f* replaces the coordinate value Xi1 in the Xi-axis direction of the first coordinate point P1 with the coordinate value Xi2 in the Xi-axis direction of the second coordinate point P2. When the coordinate value Yi1 in the Yi-axis direction of the first coordinate point P1 is greater than the coordinate value Yi2 in the Yi-axis direction of the second coordinate point P2 (Yi1>Yi2), the coordinate point calculation unit 722*f* replaces the coordinate value Yi1 in the Yi-axis direction of the first coordinate point P1 with the coordinate value Yi2 in the Yi-axis direction of the second coordinate point P2. In the present embodiment, the coordinate value Xi1 in the Xi-axis direction of the first coordinate point P1 is greater than the coordinate value Xi2 in the Xi-axis direction of the second coordinate point P2. Further, the coordinate value Yi1 in the Yi-axis direction of the first coordinate point P1 is smaller than the coordinate value Yi2 in the Yi-axis direction of the second coordinate point P2. Accordingly, the local coordinate point P3 has the coordinates (Xi2, Yi1). In this way, the coordinate point calculation unit 722*f* calculates the local coordinate point P3 indicating the position (estimated position) of the vehicle 10 in the local coordinate system, by correcting the first coordinate point P1 using the second coordinate point P2. The method for calculating the local coordinate point P3 is not limited to that described above.

As shown in FIG. 8, a vehicle type identification step (step S33) is performed after the position calculation step. The vehicle type identification step is a step of identifying the type of the vehicle 10 included in the captured image Im1. In the vehicle type identification step, the vehicle type identification unit 723 inputs the captured image Im1 to the vehicle type identification model Md2. By thus acquiring the vehicle type identification information that indicates the type of the vehicle 10 included in the captured image Im1, the vehicle type identification unit 723 identifies the type of the vehicle 10. The method for identifying the type of the vehicle 10 is not limited to that described above.

Figure 12:
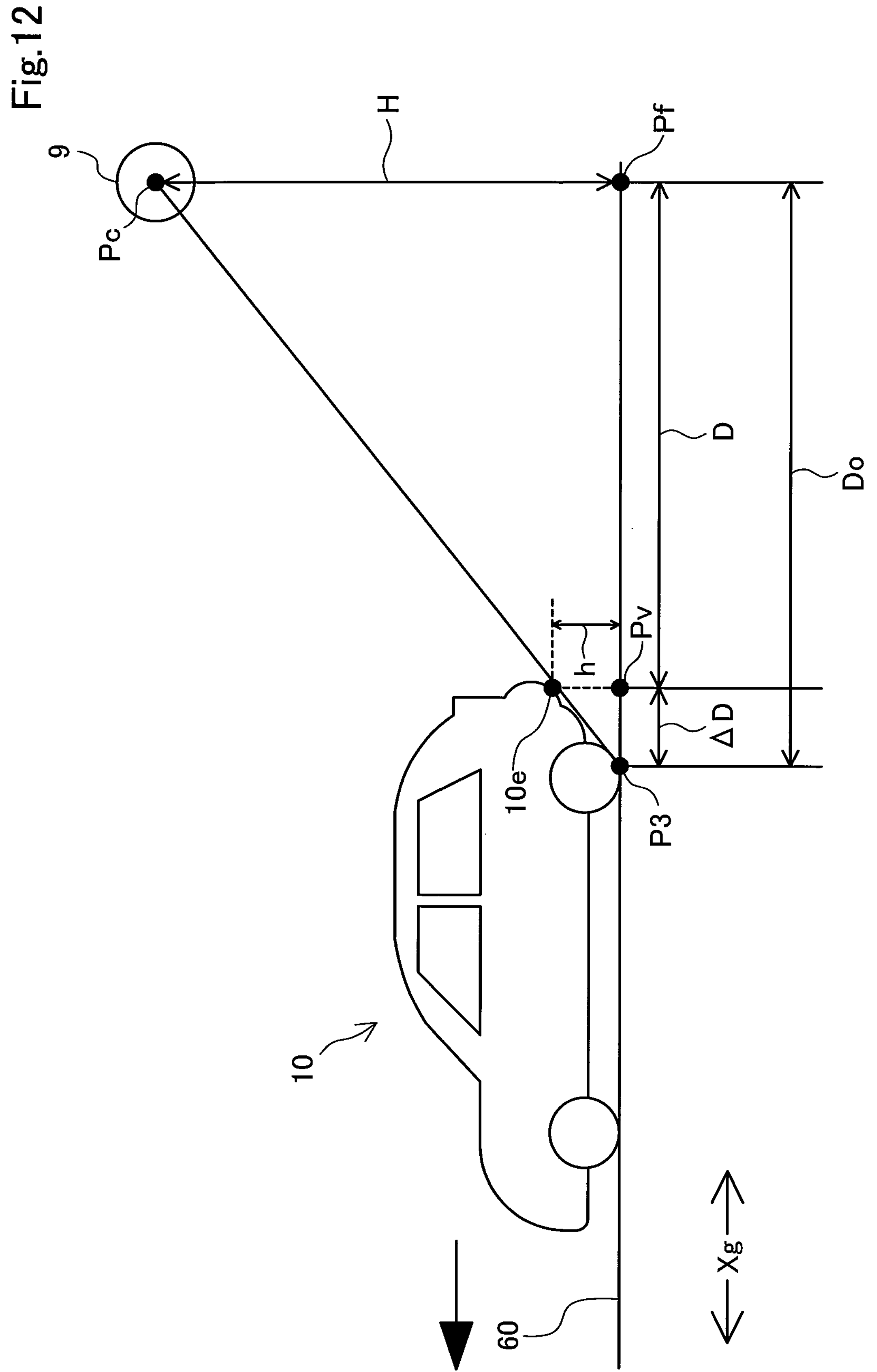
FIG. 12 is a first diagram for explaining details of a position transformation step in the first embodiment.

After the vehicle type identification step, a parameter acquisition step (step S34) is performed. The parameter acquisition step is a step of acquiring an imaging parameter and a vehicle parameter to be substituted into the relational expression. In the parameter acquisition step, the device acquisition unit 721 refers to the vehicle database D1 to acquire the value of the vehicle parameter associated with the vehicle type identification information that indicates the type identified by the vehicle type identification unit 723. In the present embodiment, the height h (in FIG. 12 shown later) of the positioning point 10*e* in the vehicle 10 from the road surface 60 differs for each type of the vehicle 10. Therefore, in the present embodiment, the vehicle parameter acquired in the parameter acquisition step is the height h from the road surface 60 of the positioning point 10*e* in the vehicle 10 of the type identified by the vehicle type identification unit 723. Furthermore, the device acquisition unit 721 refers to the camera database D2 to acquire the value of the imaging parameter associated with the camera identification information that has been received together with the captured image Im1 that includes the vehicle 10 subjected to the position estimation. In the present embodiment, in order to transform a local coordinate point to a vehicle coordinate point using the similarity between the vehicle parameter and the imaging parameter, the imaging parameters acquired in the parameter acquisition step in the present embodiment are as follows. In this case, the imaging parameter is the height H (in FIG. 12 shown later) from the road surface 60 of the imaging device 9 that acquired the captured image Im1 including the vehicle 10 subjected to the position estimation, which is the height H relative to the road surface 60 where the vehicle 10 is located. The method for acquiring vehicle parameters and imaging parameters is not limited to that described above.

As shown in FIG. 8, a position transformation step (step S37) is performed after the parameter acquisition step. The position transformation step is a step of calculating a vehicle coordinate point that indicates the position of the vehicle 10 subjected to the position estimation in the global coordinate system by transforming the local coordinate point P3 into the vehicle coordinate point. In the position transformation step, the position transformation unit 724 transforms the local coordinate point into the vehicle coordinate point using the vehicle parameter and the imaging parameter acquired in the parameter acquisition step. In the present embodiment, the position transformation unit 724 transforms the local coordinate point P3 into the vehicle coordinate point using the relational expressions represented by formulae (1) to (3) described later, which include the vehicle coordinate point as the objective variable and the local coordinate point P3, the imaging parameter, and the vehicle parameter as the explanatory variables. In this case, the position transformation unit 724 substitutes the coordinate value of the local coordinate point P3 calculated by the position calculation unit 722 into the relational expressions represented by formulae (1) to (3). The position transformation unit 724 substitutes the value of the imaging parameter acquired by the device acquisition unit 721, i.e., the value of the imaging parameter corresponding to the imaging device 9 that acquired the captured image Im1, into the relational expressions represented by formulae (1) to (3). Furthermore, the position transformation unit 724 substitutes the value of the vehicle parameter acquired by the device acquisition unit 721, i.e., the value of the vehicle parameter corresponding to the type of the vehicle 10 subjected to the position estimation, into the relational expressions represented by formulae (1) to (3).

Figure 13:
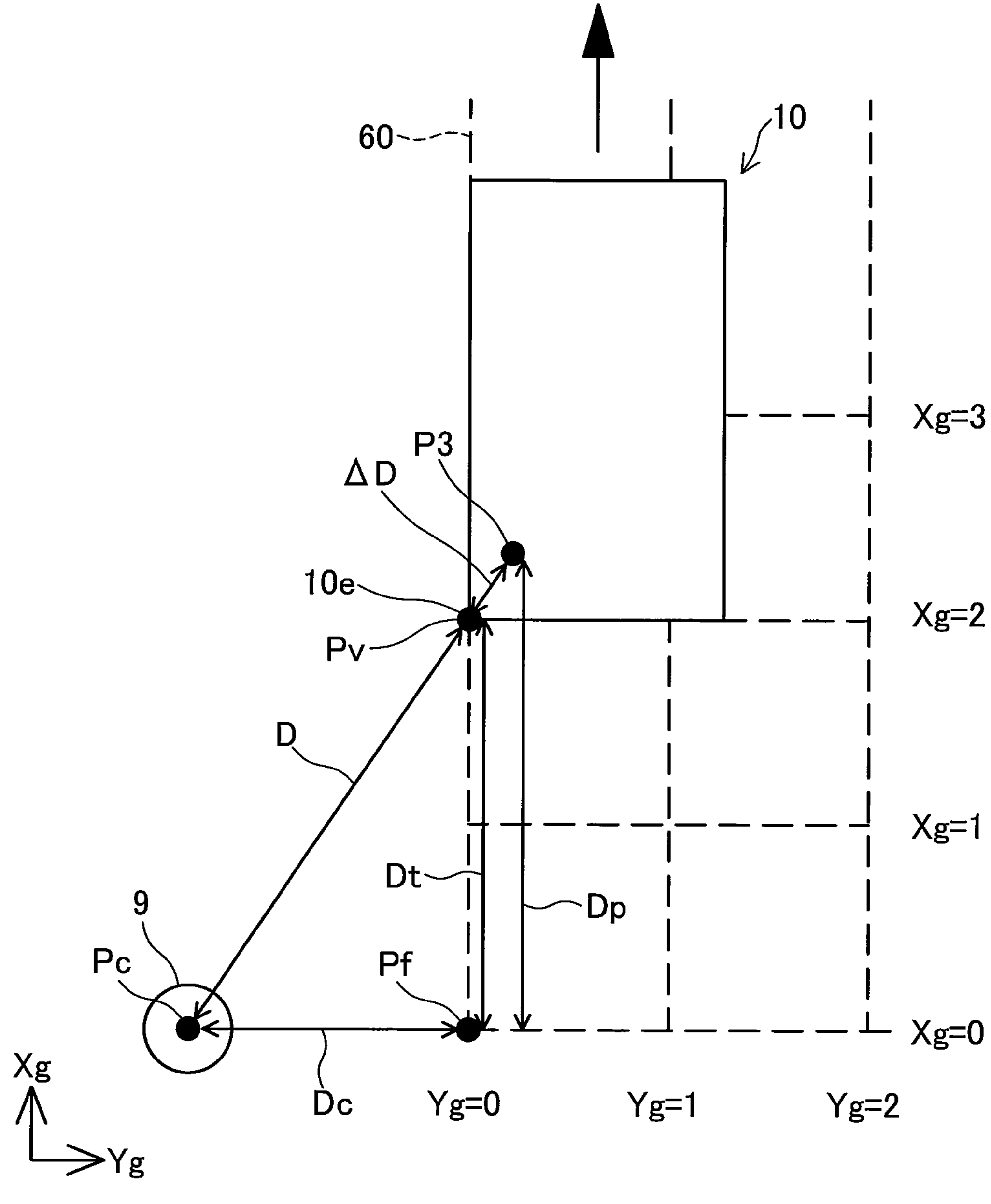
FIG. 13 is a second diagram for explaining details of the position transformation step in the first embodiment.

FIG. 12 is a first diagram for explaining details of the position transformation step in the first embodiment. FIG. 12 shows the vehicle 10 as viewed from the left side surface. FIG. 13 is a second diagram for explaining details of the position transformation step in the first embodiment. FIG. 13 shows the vehicle 10 as viewed from the roof side. The global coordinate system shown in FIG. 12 and FIG. 13 is a coordinate system with a fixed coordinate point Pf, which represents an arbitrary reference position on the road surface 60, as the origin, with the coordinate axes indicated by the Xg axis and the Yg axis, which is orthogonal to the Xg axis. An imaging coordinate point Pc is the position of the imaging device 9 that acquired the captured image Im1 used to calculate the local coordinate point P3, and is also a coordinate point indicating the position of the imaging device 9 in the global coordinate system. The fixed coordinate point Pf and the imaging coordinate point Pc are stored in advance in the device storage unit 73.

As shown in FIG. 12, Do represents the observation distance between the position of the imaging device 9 and the position of the vehicle 10 (local coordinate point P3) on the XgYg plane. ΔD represents the observation error. H represents the height [m] of the imaging device 9 from the road surface 60 as the acquired vehicle parameter. h represents the height [m] of the positioning point 10*e* of the vehicle 10 from the road surface 60 as the acquired vehicle parameter. In this case, the observation error ΔD can be expressed by the following formula (1).

$$\Delta D = h/H \times Do \quad \text{Formula (1)}$$

In other words, the larger the observation distance Do, the larger the observation error ΔD.

Next, when D represents the actual distance (hereinafter referred to as a first actual distance) between the position of the imaging device 9 and the position of the positioning point 10*e* of the vehicle 10, the first actual distance D can be expressed by the following formula (2).

$$D = Do \times (1 - h/H) \quad \text{Formula (2)}$$

In other words, the first actual distance D is determined by the observation distance Do, the height H of the imaging device 9 as the imaging parameter, and the height h of the positioning point 10*e* of the vehicle 10 as the vehicle parameter.

Then, as shown in FIG. 13, when Dp represents the estimated distance between the reference position and the estimated position of the vehicle 10, and Dt represents the actual distance (hereinafter referred to as a second actual distance) between the reference position and the position of the vehicle 10, the second actual distance Dt can be expressed by the following formula (3).

$$Dt = Dp \times (1 - h/H) \quad \text{Formula (3)}$$

Here, the estimated distance Dp can be calculated using the actual distance (hereinafter referred to as a third actual distance Dc) obtained from the fixed coordinate point Pf and the imaging coordinate point Pc, as well as the local coordinate point P3 and the fixed coordinate point Pf. Therefore, the position transformation unit 724 can calculate the vehicle coordinate point Pv using the second actual distance Dt obtained by correcting the estimated distance Dp using the formula (3) shown above, and the fixed coordinate point Pf. The vehicle coordinate point Pv thus calculated is a coordinate point indicating the position of the vehicle 10 in the global coordinate system, and therefore it corresponds to the position of the vehicle 10 in real space. In this way, the position transformation unit 724 is capable of transforming the local coordinate point P3 into the vehicle coordinate point Pv by substituting the acquired values of the imaging parameter and the vehicle parameter into the relational expressions represented by the formulae (1) to (3). To enable the remote control device 5 to generate appropriate control values according to the current location of the vehicle 10, the position estimation method for the vehicle 10 described above is repeated, for example, at predetermined time intervals.

According to the first embodiment described above, when the vehicle 10 is made to run automatically by remote control, it is possible to estimate the position of the vehicle 10 using the captured image Im1 acquired by capturing the imaging range RG including the vehicles 10 from outside of the vehicle 10. In this way, the position of the vehicle 10 can be estimated without installing sensors, markers, transmitters/receivers, and the like, which are used for position estimation of the vehicle 10, in the vehicle 10. Further, the position of the vehicle 10 can be estimated without mounting the position estimation device 7 on the vehicle 10. For this reason, the versatility of the position estimation device 7 can be increased.

Further, according to the first embodiment described above, the distortion of the captured image Im1 can be corrected when the position of the vehicle 10 is estimated using the captured image Im1. This further improves the accuracy in the position estimation of the vehicle 10.

Further, according to the first embodiment described above, when the position of the vehicle 10 is estimated using the captured image Im1, the modified image Im2 generated by processing the captured image Im1 can be rotated so that the direction of the movement vector V of the vehicle 10 faces the predetermined direction. In this way, the vehicle 10 included in the captured image Im1 can be detected with the direction the movement vector V unified. This further improves the accuracy in the position estimation of the vehicle 10.

Further, according to the first embodiment described above, the processed image Im4 can be generated by eliminating the unnecessary region by performing trimming to cut out the necessary region including the vehicle 10 from the rotated image Im3 generated by processing the captured image Im1. In this way, the vehicle 10 can be detected while eliminating other elements than the vehicle 10 subjected to the detection from the image. This allows for more accurate detection of the vehicle 10 included in the captured image Im1, thereby further improving the accuracy in the position estimation of the vehicle 10.

Further, according to the first embodiment described above, it is possible to generate the processed image Im4 by performing the trimming step to cut out the pre-movement region A1 including the vehicle 10 from the rotated image Im3 generated by processing the captured image Im1. In this way, the region of the vehicle 10 in the image can be made larger than that in the case where the trimming step is not performed. This makes it easier to detect vehicles 10 that are more distant from the imaging device 9. In this way, it is possible to further improve the accuracy of image processing with respect to vehicles 10 that are more distant from the imaging device 9.

Further, according to the first embodiment described above, the outer shape of the vehicle 10 can be detected by inputting the processed image Im4 generated by processing the captured image Im1 into the position detection model Md1, which is a trained machine learning model. This makes it possible to generate the first mask image Im5 with the mask region Ms in which the region corresponding to the vehicle 10 is masked in the processed image Im4. Here, according to the first embodiment described above, DNN with the CNN structure capable of semantic segmentation and instance segmentation can be used as the algorithm for the position detection model Md1. This prevents a decrease in the accuracy in the position estimation of the vehicle 10 due to the diversity of the background region in the captured image Im1. The background region is the region other than the region corresponding to the vehicle 10 in the captured image Im1.

Further, according to the first embodiment described above, the second mask image Im6 can be generated by perspective transformation of the first mask image Im5. This allows for the transformation of the camera coordinate system into the local coordinate system.

Further, according to the first embodiment described above, by setting the first bounding rectangle R1 on the mask region Ms before the perspective transformation of the first mask image Im5, it is possible to calculate the base coordinate point P0, which is the vertex with the closest coordinates to the positioning point 10*e* of the vehicle 10 in the first bounding rectangle R1. Then, by performing perspective transformation of the first mask image Im5 after the calculation of the base coordinate point P0, the first coordinate point P1, which is the coordinate point corresponding to the base coordinate point P0, can be calculated. Furthermore, by setting the second bounding rectangle R2 on the mask region Ms after the perspective transformation of the first mask image Im5, it is possible to calculate the second coordinate point P2, which is the vertex with the closest coordinates to the positioning point 10*e* of the vehicle 10 in the second bounding rectangle R2. Then, by correcting the first coordinate point P1 using the second coordinate point P2, the local coordinate point P3 can be calculated. By thus comparing and correcting the coordinate points before and after the perspective transformation, the local coordinate point P3 can be calculated more accurately. This further improves the accuracy in the position estimation of the vehicle 10.

Further, according to the first embodiment described above, by inputting the captured image Im1 or the images Im2 to Im4 generated by processing the captured image Im1 into the vehicle type identification model Md2, which is a trained machine learning model, it is possible to identify the type of the vehicle 10 included in the captured image Im1. That is, the type of the vehicle 10 can be identified using machine learning.

Further, according to the first embodiment described above, the value of the vehicle parameter according to the type of the vehicle 10 can be acquired by referring to the vehicle database D1, which is stored in advance in the device storage unit 73 and in which the various types of vehicles 10 are associated with vehicle parameters. Further, the value of the imaging parameter for the imaging device 9 corresponding to the captured image Im1 can be acquired by referring to the camera database D2, which is stored in advance in the device storage unit 73 and in which each imaging device 9 is associated with the imaging parameter.

Further, according to the first embodiment described above, when the position of the vehicle 10 is estimated using the captured image Im1, the position of the vehicle 10 can be estimated using the vehicle parameter that is determined according to the type of the vehicle 10. That is, the position of the vehicle 10 can be estimated in consideration of the type of the vehicle 10. This prevents a decrease in accuracy in the position estimation of the vehicle 10 when the vehicle class, etc. varies depending on the type of the vehicle 10. In other words, when the position of the vehicle 10 is estimated using the captured image Im1, the position of the vehicle 10 can be accurately estimated using the vehicle parameter that is determined according to the type of the vehicle 10.

Further, according to the first embodiment described above, the position of the vehicle 10 can be estimated in consideration of the type of the vehicle 10. This allows for appropriate position estimation of the vehicle 10 according to the type of the vehicle 10 even when a plurality of types of vehicles 10 are running in the remote automatic driving mode.

Further, according to the first embodiment described above, when the local coordinate point P3 is transformed into the vehicle coordinate point Pv, the value of the vehicle parameter according to the type of the vehicle 10 and the value of the imaging parameter corresponding to the captured image Im1 are substituted into a relational expression including the vehicle coordinate point Pv as the objective variable and the local coordinate point P3, the imaging parameter, and the vehicle parameter as explanatory variables. This allows for the transformation of the local coordinate point P3 into the vehicle coordinate point Pv.

Further, according to the first embodiment described above, the imaging parameter is the height H of the imaging device 9 from the road surface 60 calculated based on the position of the imaging device 9 in the global coordinate system. Further, the vehicle parameter is the height h of the predetermined positioning point 10*e* of the vehicle 10 from the road surface 60. In this way, the observation error ΔD can be calculated from the similarity between the imaging parameter and the vehicle parameter. Then, the local coordinate point P3 can be transformed into the vehicle coordinate point Pv using the calculated observation error ΔD.

Further, according to the first embodiment described above, the position of the vehicle 10 can be estimated without using data from GNSS satellite and the like. This allows for position estimation of the vehicle 10 even when the vehicle 10 is running on the road surface 60 provided indoor places or the like where data from GNSS satellite is not easily receivable.

B. Second Embodiment

Figure 14:
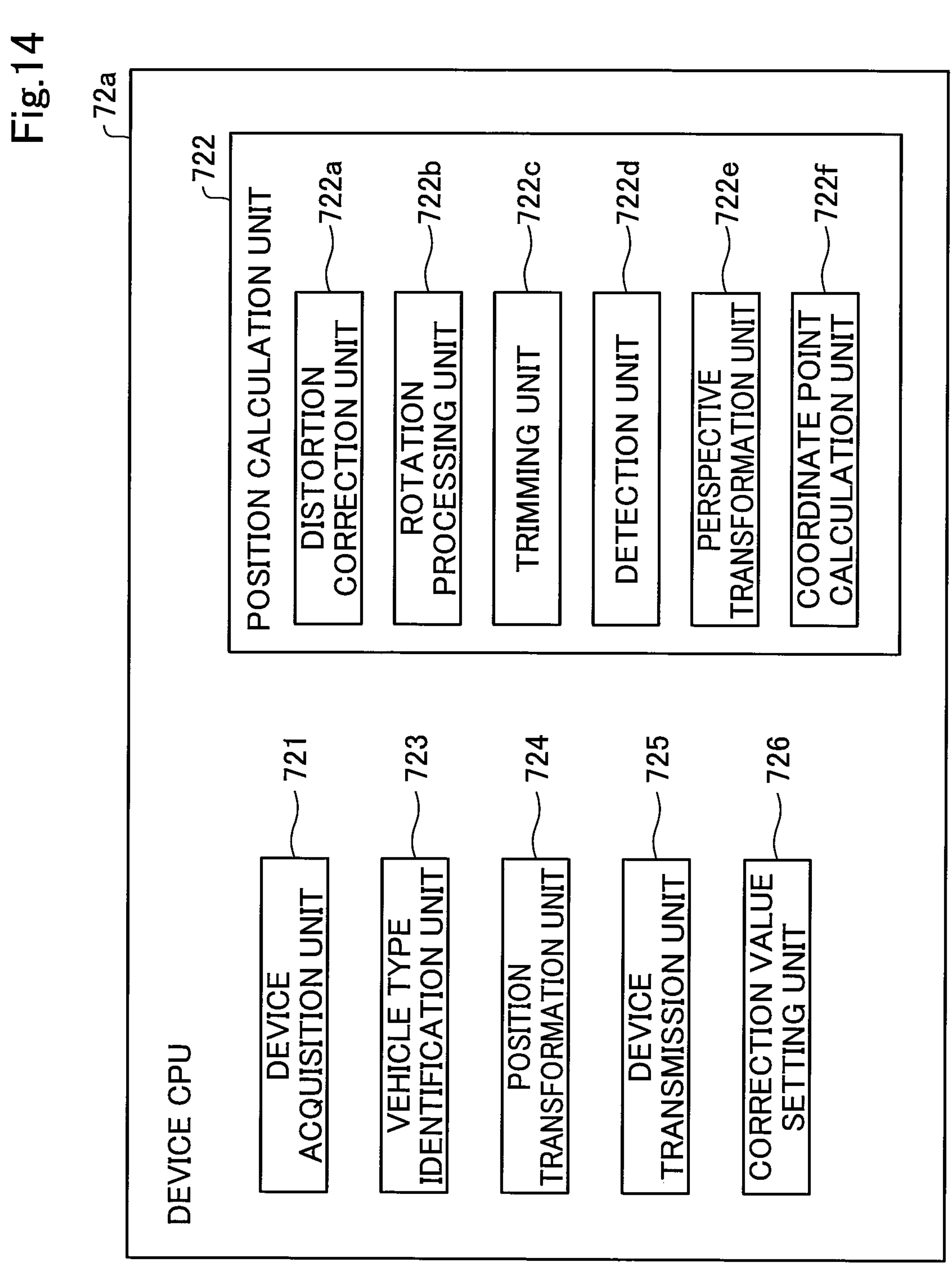
FIG. 14 illustrates details of a device CPU in a second embodiment.
Figure 15:
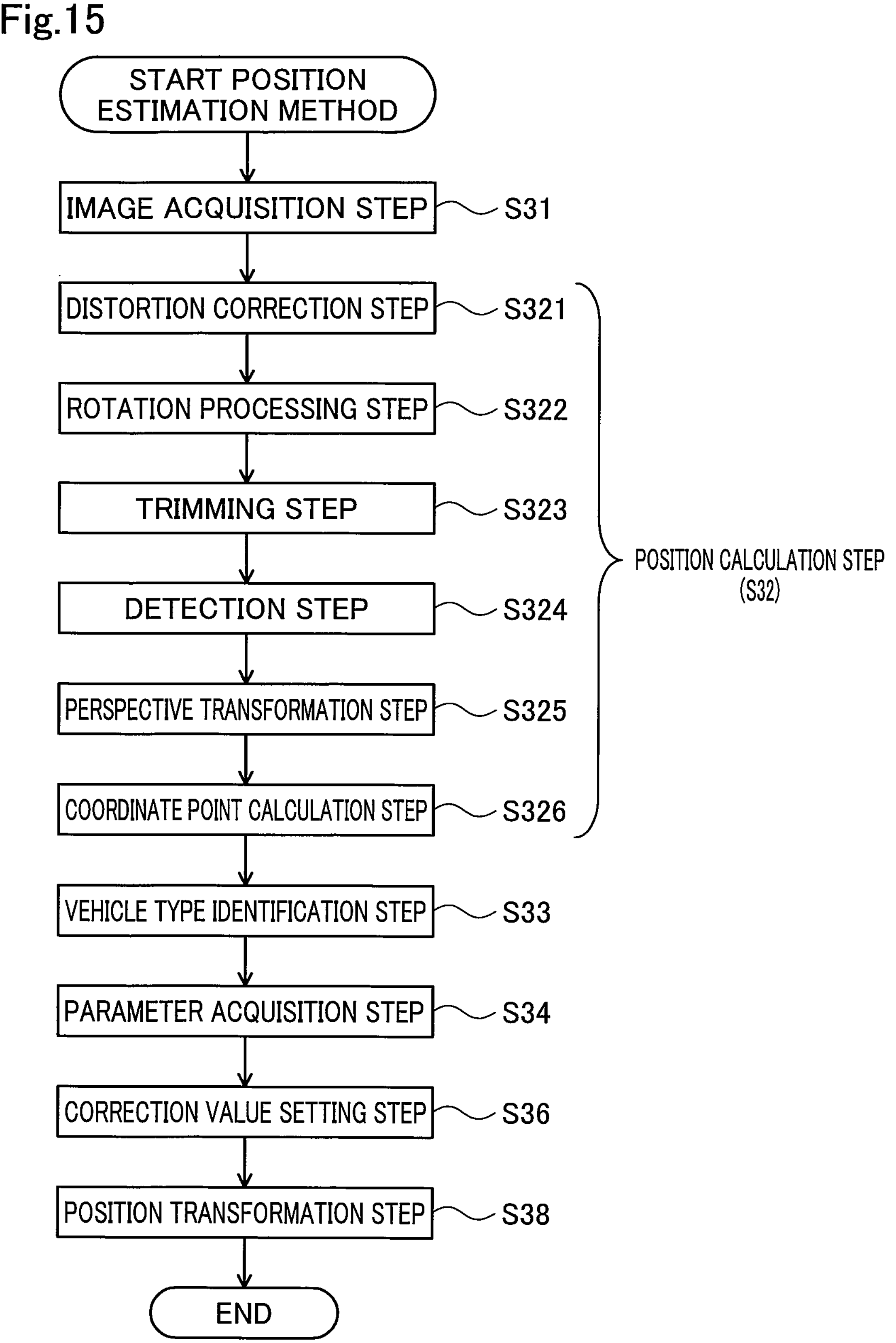
FIG. 15 is a flowchart of a vehicle position estimation method in the second embodiment.

FIG. 14 is a diagram illustrating details of a device CPU 72*a* in the second embodiment. FIG. 15 is a flowchart of a position estimation method for the vehicle 10 in the second embodiment. In the present embodiment, the transformation method for the transformation of the local coordinate point P3 into the vehicle coordinate point Pv differs from that in the first embodiment. Specifically, in the present embodiment, the device CPU 72 further includes a correction value setting unit 726. The correction value setting unit 726 sets a correction parameter by calculating the difference between the vehicle parameter acquired by the device acquisition unit 721 and the reference parameter. Then, the position transformation unit 724 transforms the local coordinate point P3 into the vehicle coordinate point Pv using the relational expressions represented by formulae (4) to (6) described later, which include the vehicle coordinate point Pv as the objective variable and the local coordinate point P3, the imaging parameter, the reference parameter, and the correction parameter as the explanatory variables. The reference parameter is a parameter indicating the reference value of the vehicle parameter. The reference parameter is, for example, a vehicle parameter of the vehicle 10 of a predetermined type. The reference parameter is stored in advance, for example, in the device storage unit 73. The correction parameter is a parameter that is determined based on the type of the vehicle 10 and that indicates the correction value with respect to the reference parameter. Therefore, in the present embodiment, the function of the device CPU 72 and the position estimation method for the vehicle 10 are partially different from those in the first embodiment. Other structures are the same as those in the first embodiment. The same step and the same structure as those in the first embodiment are given the same symbols and the explanations thereof are omitted.

As shown in FIG. 15, a correction value setting step (step S36) is performed after the parameter acquisition step. In the correction value setting step, the correction value setting unit 726 sets a correction parameter, which is determined according to the type of the vehicle 10 identified by the vehicle type identification unit 723, by calculating the difference between the vehicle parameter acquired by the device acquisition unit 721 and the reference parameter. If the correction parameter is greater than the reference parameter, the correction parameter is a positive value. If the correction parameter is smaller than the reference parameter, the correction parameter is a negative value. If the correction parameter is equal to the reference parameter, the correction parameter is zero.

After the correction value setting step, a position transformation step (step S38) is performed. In the position transformation step, the position transformation unit 724 transforms the local coordinate point P3 into the vehicle coordinate point Pv using the relational expressions represented by formulae (4) to (6). Specifically, the position transformation unit 724 substitutes the coordinate value of the local coordinate point P3 calculated by the position calculation unit 722 into the relational expressions represented by formulae (4) to (6). The position transformation unit 724 substitutes the value of the imaging parameter acquired by the device acquisition unit 721 into the relational expressions represented by formulae (4) to (6). The position transformation unit 724 substitutes the reference parameter stored in advance in the device storage unit 73 into the relational expressions represented by formulae (4) to (6). Furthermore, the position transformation unit 724 substitutes the correction parameter set by the correction value setting unit 726, i.e., the correction parameter according to the type of the vehicle 10 subjected to the position estimation, into the relational expressions represented by formulae (4) to (6). In the following, the details of the position transformation step in the present embodiment are described.

Figure 16:
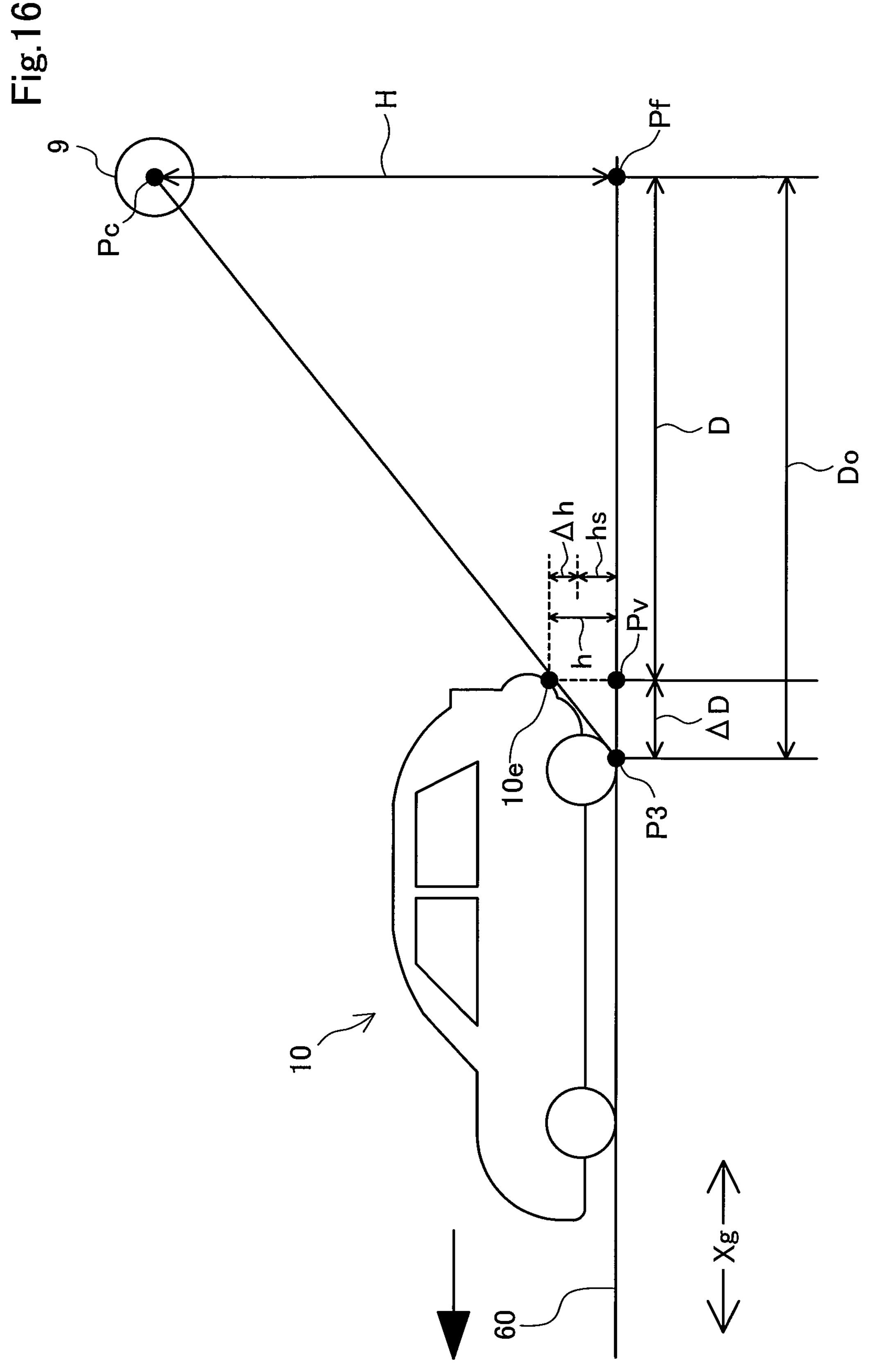
FIG. 16 is a first diagram for explaining details of a position transformation step in the second embodiment.
Figure 17:
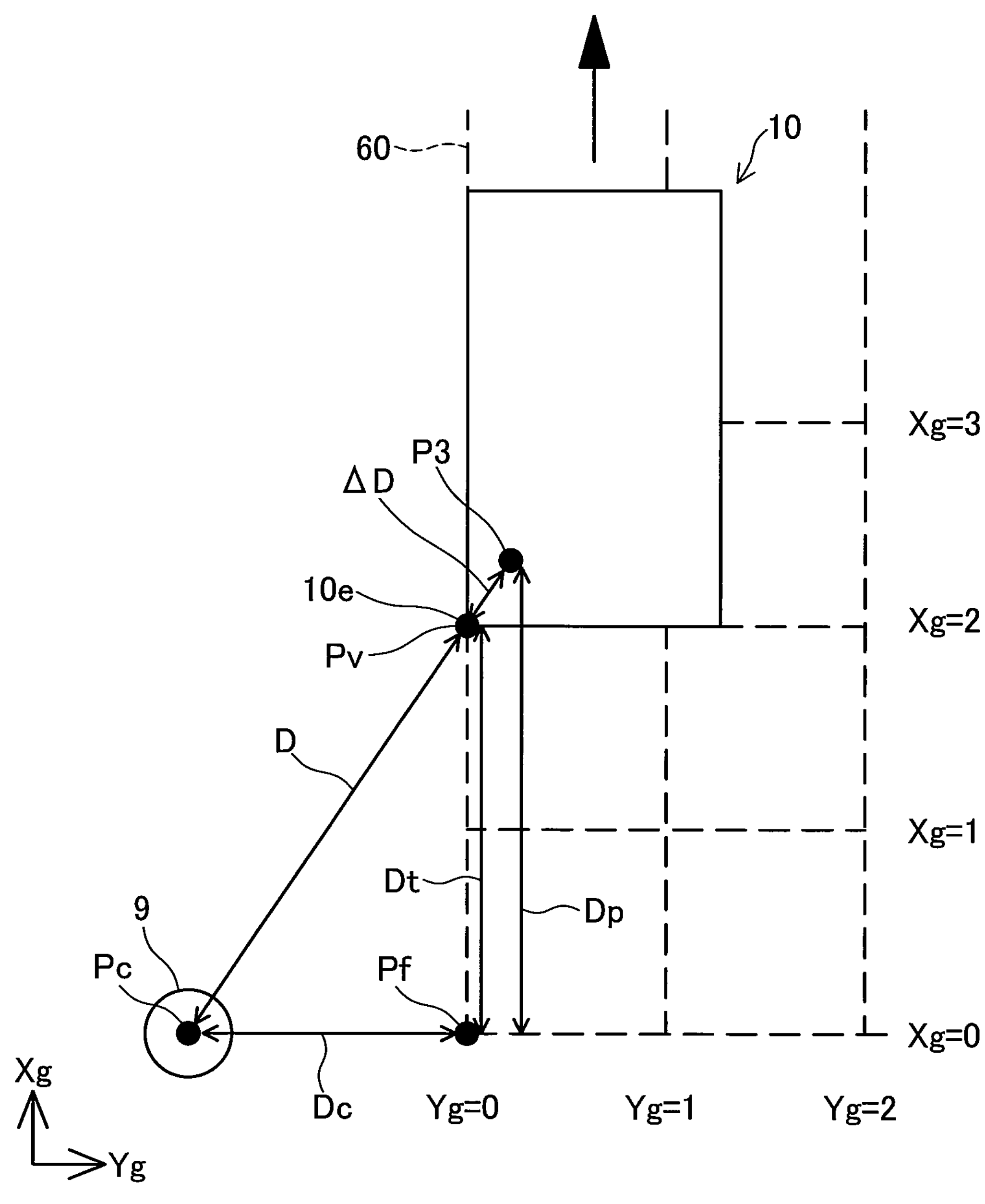
FIG. 17 is a second diagram for explaining details of the position transformation step in the second embodiment.

FIG. 16 is a first diagram for explaining details of the position transformation step in the second embodiment. FIG. 16 shows the vehicle 10 as viewed from the left side surface. FIG. 17 is a second diagram for explaining details of the position transformation step in the second embodiment. FIG. 17 shows the vehicle 10 as viewed from the roof side.

As shown in FIG. 16, Do represents the observation distance between the position of the imaging device 9 and the position of the vehicle 10 (local coordinate point P3) on the XgYg plane. ΔD represents the observation error. H represents the height [m] of the imaging device 9 from the road surface 60 as the acquired imaging parameter. h represents the height [m] of the positioning point 10*e* of the vehicle 10 from the road surface 60 as the acquired vehicle parameter. hs represents the reference parameter. In the present embodiment, the reference parameter hs is the height [m] of the positioning point 10*e* of the vehicle 10 of a predetermined type from the road surface 60. Δh represents the correction parameter. In the present embodiment, the correction parameter Δh is the difference between the height hs as the reference parameter and the height h of the positioning point 10*e* of the vehicle 10 subjected to the position estimation from the road surface 60. In this case, the observation error ΔD can be expressed by the following formula (4).

$$\Delta D = (hs + \Delta h)/H \times Do \quad \text{Formula (4)}$$

In other words, the larger the observation distance Do, the larger the observation error ΔD.

Next, when D represents the first actual distance, which is the actual distance between the position of the imaging device 9 and the position of the positioning point 10*e* of the vehicle 10, the first actual distance D can be expressed by the following formula (5).

$$D = Do \times \left[\{1 - (hs + \Delta h)\}/H\right] \quad \text{Formula (5)}$$

That is, the first actual distance D is determined by the observation distance Do, the height H of the imaging device 9 as the imaging parameter, and the correction parameter Δh.

Then, as shown in FIG. 17, when Dp represents the estimated distance between the reference position and the estimated position of the vehicle 10, and Dt represents the second actual distance, which is the actual distance between the reference position and the position of the vehicle 10, the second actual distance Dt can be expressed by the following formula (6).

$$Dt = Dp \times \left[\{1 - (hs + \Delta h)\}/H\right] \quad \text{Formula (6)}$$

Here, the estimated distance Dp can be calculated using the third actual distance Dc, the local coordinate point P3, and the fixed coordinate point Pf, as in the first embodiment. Therefore, the position transformation unit 724 can calculate the vehicle coordinate point Pv using the second actual distance Dt obtained by correcting the estimated distance Dp using the formula (6) shown above, and the fixed coordinate point Pf. In this way, it is possible to transform the local coordinate point P3 into the vehicle coordinate point Pv by substituting the acquired value of the imaging parameter and the set value of the correction parameter Δh into the relational expressions represented by the formulae (4) to (6).

According to the second embodiment described above, when the local coordinate point P3 is transformed into the vehicle coordinate point Pv, the imaging parameter corresponding to the captured image Im1 and the correction parameter Δh set according to the type of the vehicle 10 are substituted into a relational expression including the vehicle coordinate point Pv as the objective variable and the local coordinate point P3, the imaging parameter, the reference parameter hs, and the correction parameter Δh as explanatory variables. This allows for the transformation of the local coordinate point P3 into the vehicle coordinate point Pv.

C. Third Embodiment

Figure 18:
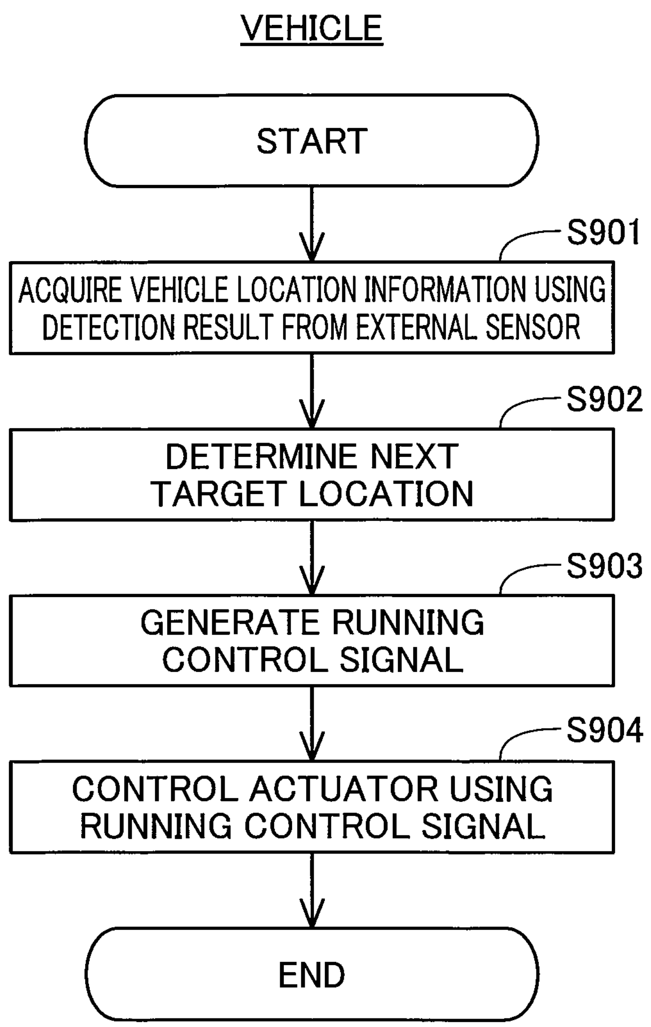
FIG. 18 is a flowchart of procedures in the process of running control of a vehicle in a third embodiment.

FIG. 18 is a flowchart of procedures in the process of running control of a vehicle in the third embodiment. Since the device configuration of the vehicle in the present embodiment is the same as that in the first embodiment, the vehicle in the present embodiment is denoted as a vehicle 10 for convenience. In step S901, the vehicle 10 acquires vehicle location information using detection result output from the camera as an imaging device that is an external sensor. In step S902, the vehicle 10 determines a target location to which the vehicle 10 is to move next. In step S903, the vehicle 10 generates a running control signal for causing the vehicle 10 to run to the determined target location. In step S904, the vehicle 10 controls an actuator using the generated running control signal, thereby causing the vehicle 10 to run by following a parameter indicated by the running control signal. The vehicle 10 repeats the acquisition of vehicle location information, the determination of a target location, the generation of a running control signal, and the control over the actuator in a predetermined cycle. According to the running control in the present embodiment, it is possible to cause the vehicle 10 to run by autonomous control without controlling the vehicle 10 remotely using the remote control device 5. In the third embodiment, the vehicle 10 may have a function as the position estimation device 7 in the first and second embodiments described above.

D. Alternative Embodiments

D-1. Alternative Embodiment 1

In an alternative embodiment, when the type of the vehicle 10 identified by the vehicle type identification unit 723 is a predetermined type, the correction value setting unit 726 may set the correction parameter Δh to zero without calculating the difference between the vehicle parameter and the reference parameter hs. The predetermined type is, for example, a type having a difference from the reference parameter hs less than a predetermined threshold. In this case, the vehicle database D1 may further include determination information for determining whether or not the type of the vehicle 10 identified by the vehicle type identification unit 723 is a type having a difference from the reference parameter hs less than the predetermined threshold. The determination information is, for example, information in which the vehicle type identification information is associated with information as to whether correction is necessary. The information as to whether correction is necessary indicates whether or not the type of the vehicle is a type having a difference from the reference parameter hs less than the predetermined threshold. The correction value setting unit 726 determines whether the correction parameter Δh should be set to zero or not by referring to the information as to whether correction is necessary corresponding to the vehicle type identification information indicating the type of the vehicle 10 identified by the vehicle type identification unit 723. In such an embodiment, when the difference between the vehicle parameter and the reference parameter hs for the vehicle 10 subjected to the position estimation is less than a predetermined threshold, the position of the vehicle 10 can be estimated without taking into account the correction parameter Δh according to the type of the vehicle 10. That is, when the value of the vehicle parameter for the vehicle 10 subjected to the position estimation is equal to or close to the value of the reference parameter hs, the position of the vehicle 10 can be estimated without correcting the vehicle parameter. In this way, the processing in the process of setting the correction parameter Δh can be simplified.

D-2. Alternative Embodiment 2

In an alternative embodiment, the position estimation device 7 may further include a direction information generation unit as a function of the device CPU 72. The direction information generation unit generates direction information indicating the movement direction of the vehicle 10 using a plurality of vehicle coordinate points Pv acquired at intervals. In other words, the direction information generation unit generates the direction information using a plurality of vehicle coordinate points Pv acquired for the same vehicle 10 at different timings. Specifically, the direction information generation unit generates the direction information, for example, by arranging the vehicle coordinate points Pv generated from a plurality of captured images Im1 captured by different imaging devices 9 in chronological order. In such an embodiment, the actual running trajectory of the vehicle 10 can be calculated. Further, such an embodiment also allows for the estimation of the traveling direction of the vehicle 10. This allows for, for example, estimation of the movement direction of a running vehicle 10 using the direction information when the position estimation method shown in FIG. 8 and FIG. 15 is repeated at predetermined time intervals.

D-3. Alternative Embodiment 3

In an alternative embodiment, the vehicle type identification unit 723 may identify the type of the vehicle 10 included in the captured image Im1 using schedule information stored in advance in the device storage unit 73. The schedule information indicates which type of the vehicle 10 is scheduled to run on which position on the target running route at which point in time. The schedule information is, for example, information in which the vehicle type identification information, the imaging position information, and the timing information are associated with each other. The imaging position information is information indicating the imaging range RG of the imaging device 9 identified by the camera identification information. Therefore, the imaging position information is information that indicates the position range on the target running route. The timing information is information indicating the scheduled time for the vehicle 10 of the type identified by the vehicle type identification information to run within the imaging range RG identified by the imaging position information. The schedule information is not limited to that described above. In the case where a plurality of vehicles 10 of a single type are continuously produced in a factory and the captured image Im1 is acquired by the imaging device 9 to estimate the positions of the vehicles 10 running on the target running route in the factory during the production process, the schedule information may be as follows. In this case, the schedule information may include step position information instead of the imaging position information. The step position information indicates the position of the work site where the production step identified by the step identification information (step ID), which identifies a plurality of production steps performed in the production process of the vehicle 10 from one another, is performed. Therefore, the step position information is information that indicates the position range on the target running route. Further, when the schedule information includes the step position information instead of the imaging position information, the timing information is information that indicates the scheduled time for performing the production step identified by the step identification information on the vehicle 10 of the type identified by the vehicle type identification information. That is, in this case, the schedule information is production plan information indicating the production plan for each type of the vehicle 10. In such an embodiment, it is possible to identify the type of the vehicle 10 included in the captured image Im1 using the schedule information. This allows for the identification of the type of the vehicle 10 included in the captured image Im1 without performing image analysis, thereby reducing the processing load on the vehicle type identification unit 723 in the vehicle type identification step.

D-4. Alternative Embodiment 4

The distortion correction step is not an essential step in the position calculation step. For example, if, in the position calculation step, each step after the rotation processing step is performed without the distortion correction step, the rotation processing unit 722*b* performs the following process. In this case, in the rotation processing step, the rotation processing unit 722*b* rotates the captured image Im1 instead of the modified image Im2. Such an embodiment also enables calculation of the local coordinate point P3.

D-5. Alternative Embodiment 5

The rotation processing step is not an essential step in the position calculation step. For example, if the distortion correction step and the rotation processing step are not performed in the position calculation step, the trimming unit 722*c* performs the following process. In other words, if only each step after the trimming step is performed in the position calculation step, the trimming unit 722*c* performs the following process. In this case, the trimming unit 722*c* performs the trimming with respect to the captured image Im1 instead of the rotated image Im3. Such an embodiment also enables calculation of the local coordinate point P3.

D-6. Alternative Embodiment 6

The trimming step is not an essential step in the position calculation step. For example, if the distortion correction step, the rotation processing step, and the trimming step are not performed in the position calculation step, the detection unit 722*d* performs the following process. In other words, if only each step after the detection step is performed in the position calculation step, the detection unit 722*d* performs the following process. In this case, the detection unit 722*d* generates the first mask image Im5 by masking the vehicle 10 included in the captured image Im1 instead of the processed image Im4. Such an embodiment also enables calculation of the local coordinate point P3.

D-7. Alternative Embodiment 7

In an alternative embodiment, the captured image Im1 may include a plurality of vehicles 10. In this case, the device CPU 72 may further include a deletion unit that deletes, for example, the mask region Ms of the vehicle 10 that is not subjected to the position estimation from the first mask image Im5. The deletion unit, for example, finds a mask region Ms that exists outside the target recognition range as the mask region Ms of the vehicle 10 not subjected to the position estimation, from among the mask regions Ms generated in the detection step, and deletes it from the first mask image Im5. The target recognition range is, for example, a predetermined region where the vehicle 10 moves in the first mask image Im5. The predetermined region where the vehicle 10 moves is, for example, the region corresponding to the region of the grid line 61. The target recognition range is stored in advance in the device storage unit 73. In such an embodiment, it is possible to eliminate the influence of the vehicle 10 that is not subjected to the position estimation when a plurality of vehicles 10 are captured in the captured image Im1. This improves the accuracy in the position estimation of the vehicle 10.

D-8. Alternative Embodiment 8

In an alternative embodiment, the captured image Im1 may include a plurality of vehicles 10. In this case, a DNN that performs instance segmentation, such as YOLACT++ or the like, may be used as an algorithm for the position detection model Md1. In such an embodiment, the plurality of vehicles 10 included in the captured image Im1 can be classified, and a first mask image Im5 with masking for each vehicle 10 can be generated. This allows for selection of the vehicle 10 subjected to the position estimation when a plurality of vehicles 10 are included in the captured image Im1, and estimation of the position of the selected vehicle 10.

D-9. Alternative Embodiment 9

In an alternative embodiment, the captured image Im1 may include a plurality of vehicles 10. In this case, the vehicle type identification unit 723 identifies the type of the vehicle 10 to be subjected to the position estimation without identifying the type of the vehicle 10 that is not subjected to the position estimation, using the vehicle type identification model Md2 capable of classifying a plurality of vehicles 10 included in the captured image Im1. In such an embodiment, even when a plurality of vehicles 10 are included in the captured image Im1, it is possible to identify the type of the vehicle 10 to be subjected to the position estimation.

D-10. Alternative Embodiment 10

In an alternative embodiment, the position estimation device 7 may estimate the position of a stationary vehicle 10. When the position of a stationary vehicle 10 is estimated, the position estimation device 7 estimates the position of the vehicle 10 using, for example, instead of the direction of the movement vector V of the running vehicle 10, the initial vector direction of the vehicle 10 estimated from the captured image Im1 that is acquired first after the booting of the position estimation device 7. In such an embodiment, the position of the vehicle 10 can be estimated using the captured image Im1 even when the vehicle 10 is stationary.

D-11. Alternative Embodiment 11

In an alternative embodiment, the position estimation device 7 may process three-dimensional images captured by a stereo camera or TOF (Time Of Flight) camera serving as the imaging device 9. Such an embodiment expands the target range of processing, thus increasing the versatility of the position estimation device 7.

D-12. Alternative Embodiment 12

In an alternative embodiment, the remote control device 5 and the position estimation device 7 may be integrated into one unit. Further, in another alternative embodiment, each unit of the position estimation device 7 may be implemented by, for example, cloud computing constituted of one or more computers. In such an embodiment, the configuration of the position estimation device 7 can be changed as needed.

D-13. Alternative Embodiment 13

In an alternative embodiment, the position estimation device 7 may estimate the position of the vehicle 10 running in the unmanned driving mode. The unmanned driving mode is a driving mode in which the vehicle 10 runs by receiving running conditions generated by an operation of an operator input device by an operator, with no drivers on board the vehicle 10. In such an embodiment, the position of the vehicle 10 can be estimated not only for the vehicles 10 running in the remote automatic driving mode, but also for the vehicles 10 running in the unmanned driving mode. For this reason, the versatility of the position estimation device 7 can be increased.

D-14. Alternative Embodiment 14

In an alternative embodiment, the device CPU 72 may include two or more functional units for implementing the function of the device acquisition unit 721. For example, the device CPU 72 may include an image acquisition unit that acquires the captured image Im1 and a parameter acquisition unit that acquires the vehicle parameter and the imaging parameter. Such an embodiment also enables the device CPU 72 to acquire various types of information as required.

D-15. Alternative Embodiment 15

In the embodiments described above, the vehicle parameter is the height h of the positioning point 10*e* of the vehicle

10 from the road surface 60. That is, in the embodiments described above, the vehicle parameter is the distance to the road surface 60 along the direction of the height of the vehicle 10. However, the present disclosure is not limited to that described above. The vehicle parameter may be, for example, the distance from the road boundary, which is the reference point on the track of the vehicle 10, to the positioning point 10*e* of the vehicle 10. That is, the vehicle parameter may be the distance to the reference point along the width direction of the vehicle 10. In such an embodiment, when the vehicle 10 has a different size (hereinafter referred to as "a vehicle width") in the width direction of the vehicle 10 depending on the type of the vehicle 10, the position of the vehicle 10 can be estimated using the value regarding the vehicle width as the vehicle parameter.

D-16. Alternative Embodiment 16

In each of the embodiments described above, it is sufficient as long as the vehicle 10 includes a configuration that enables movement by remote control. For example, the vehicle 10 may be embodied as a platform having the configuration described below. Specifically, it is sufficient that the vehicle 10 is equipped with at least the vehicle control device 2, the driving device 11, the steering device 12, the braking device 13, and the vehicle communication unit 21, in order to perform the three functions: "running," "turning," and "stopping" by remote control. That is, the vehicle 10 movable by remote control may not be equipped with at least some of the interior components such as a driver's seat and dashboard, at least some of the exterior components such as bumpers and fenders, or a body shell. In this case, the remaining parts such as the body shell may be installed in the vehicle 10 before the vehicle 10 is shipped from the factory, or the remaining parts such as the body shell may be installed in the vehicle 10 after the vehicle 10 in which the remaining parts such as the body shell are not installed is shipped from the factory. The position estimation can be made also for this platform embodiment in the same manner as for the vehicle 10 in each embodiment.

E. Alternative Modified Embodiment

In each of the above-described embodiments, the external sensor is not limited to the camera but may be the distance measuring device, for example. The distance measuring device is a light detection and ranging (LiDAR) device, for example. In this case, detection result output from the external sensor may be three-dimensional point cloud data representing the vehicle 10. The server 5,7 and the vehicle 10 may acquire the vehicle location information through template matching using the three-dimensional point cloud data as the detection result and reference point cloud data, for example.

In the above-described first embodiment, the server 5,7 performs the processing from acquisition of vehicle location information to generation of a running control signal. By contrast, the vehicle 10 may perform at least part of the processing from acquisition of vehicle location information to generation of a running control signal. For example, embodiments (1) to (3) described below are applicable, for example.

(1) The server 5,7 may acquire vehicle location information, determine a target location to which the vehicle 10 is to move next, and generate a route from a current location of the vehicle 10 indicated by the acquired vehicle location information to the target location. The server 5,7 may generate a route to the target location between the current location and a destination or generate a route to the destination. The server 5,7 may transmit the generated route to the vehicle 10. The vehicle 10 may generate a running control signal in such a manner as to cause the vehicle 10 to run along the route received from the server 5,7 and control an actuator using the generated running control signal.

(2) The server 5,7 may acquire vehicle location information and transmit the acquired vehicle location information to the vehicle 10. The vehicle 10 may determine a target location to which the vehicle 10 is to move next, generate a route from a current location of the vehicle 10 indicated by the received vehicle location information to the target location, generate a running control signal in such a manner as to cause the vehicle 10 to run along the generated route, and control an actuator using the generated running control signal.

(3) In the foregoing embodiments (1) and (2), an internal sensor may be mounted on the vehicle 10, and detection result output from the internal sensor may be used in at least one of the generation of the route and the generation of the running control signal. The internal sensor is a sensor mounted on the vehicle 10. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server 5,7 may acquire detection result from the internal sensor, and in generating the route, may reflect the detection result from the internal sensor in the route. In the foregoing embodiment (1), the vehicle 10 may acquire detection result from the internal sensor, and in generating the running control signal, may reflect the detection result from the internal sensor in the running control signal. In the foregoing embodiment (2), the vehicle 10 may acquire detection result from the internal sensor, and in generating the route, may reflect the detection result from the internal sensor in the route. In the foregoing embodiment (2), the vehicle 10 may acquire detection result from the internal sensor, and in generating the running control signal, may reflect the detection result from the internal sensor in the running control signal.

In the above-described embodiment in which the vehicle 10 can be running by autonomous control, the vehicle 10 may be equipped with an internal sensor, and detection result output from the internal sensor may be used in at least one of generation of a route and generation of a running control signal. For example, the vehicle 10 may acquire detection result from the internal sensor, and in generating the route, may reflect the detection result from the internal sensor in the route. The vehicle 10 may acquire detection result from the internal sensor, and in generating the running control signal, may reflect the detection result from the internal sensor in the running control signal.

In the above-described embodiment in which the vehicle 10 can be running by autonomous control, the vehicle 10 acquires vehicle location information using detection result from the external sensor. By contrast, the vehicle 10 may be equipped with an internal sensor, the vehicle 10 may acquire vehicle location information using detection result from the internal sensor, determine a target location to which the vehicle 10 is to move next, generate a route from a current location of the vehicle 10 indicated by the acquired vehicle location information to the target location, generate a running control signal for running along the generated route, and control an actuator of the vehicle 10 using the generated running control signal. In this case, the vehicle 10 is capable of running without using any detection result from an external sensor. The vehicle 10 may acquire target arrival time or traffic congestion information from outside the vehicle 10 and reflect the target arrival time or traffic congestion information in at least one of the route and the running control signal. The functional configuration of the position estimation system 1 may be entirely provided at the vehicle 10. Specifically, the processes realized by the position estimation system 1 in the present disclosure may be realized by the vehicle 10 alone.

In the above-described first embodiment, the server 5,7 automatically generates a running control signal to be transmitted to the vehicle 10. By contrast, the server 5,7 may generate a running control signal to be transmitted to the vehicle 10 in response to operation by an external operator existing outside the vehicle 10. For example, the external operator may operate an operating device including a display on which a captured image output from the external sensor is displayed, steering, an accelerator pedal, and a brake pedal for operating the vehicle 10 remotely, and a communication device for making communication with the server 5,7 through wire communication or wireless communication, for example, and the server 5,7 may generate a running control signal responsive to the operation on the operating device.

In each of the above-described embodiments, the vehicle 10 is simply required to have a configuration to become movable by unmanned driving. The vehicle 10 may embodied as a platform having the following configuration, for example. The vehicle 10 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 10. In order for the vehicle 10 to acquire information from outside for unmanned driving, the vehicle 10 is simply required to include the communication device further. Specifically, the vehicle 10 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 10 before the vehicle 10 is shipped from a factory, or a remaining component such as a bodyshell may be mounted on the vehicle 10 after the vehicle 10 is shipped from a factory while the remaining component such as a bodyshell is not mounted on the vehicle 10. Each of components may be mounted on the vehicle 10 from any direction such as from above, from below, from the front, from the back, from the right, or from the left. Alternatively, these components may be mounted from the same direction or from respective different directions. The location determination for the platform may be performed in the same way as for the vehicle 10 in the first embodiments.

The vehicle 10 may be manufactured by combining a plurality of modules. The module means a unit composed of one or more components grouped according to a configuration or function of the vehicle 10. For example, a platform of the vehicle 10 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 10 different from the platform may be modularized. Various modules may include an arbitrary exterior component such as a bumper or a grill, or an arbitrary interior component such as a seat or a console. Not only the vehicle 10 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The present disclosure is not limited to the embodiments described above, but can be realized in various configurations without departing from the spirit thereof. For example, the technical features of the embodiments corresponding to the technical features in each of the aspects stated in the Summary section may be replaced or combined as appropriate to solve some or all of the problems described above or to achieve some or all of the effects described above. Further, if the technical feature is not described as essential in this specification, the technical feature may be deleted as appropriate.

What is claimed is:

1. A position estimation and remote control system, comprising:

a position estimation device comprising a processor programmed to:

acquire a captured image including a moving object from an imaging device;

calculate, using the captured image, a local coordinate point that indicates a position of the moving object in a local coordinate system;

identify a type of the moving object included in the captured image; and transform the local coordinate point into a moving object coordinate point, which indicates the position of the moving object in a global coordinate system, using (i) an imaging parameter calculated based on a position of the imaging device in the global coordinate system and (ii) a moving object parameter obtained by referring to a moving object database and determined according to the identified type of the moving object; and a remote control device comprising a processor programmed to generate, based on the moving object coordinate point, running control signals for controlling running operation of the moving object, wherein the processor of the position estimation device is further programmed to:

calculate a difference between the obtained moving object parameter and a reference parameter that indicates a reference value of the moving object parameter to set a correction parameter, which indicates a correction value relative to the reference parameter and is determined according to the identified type of the moving object;

when the local coordinate point is transformed into the moving object coordinate point, substitute the correction parameter into a relational expression, which includes the moving object coordinate point as an objective variable and the local coordinate point, the imaging parameter, the reference parameter, and the correction parameter as explanatory variables; and when the identified type of the moving object is predetermined type set the correction parameter to zero without calculating the difference.

2. The system according to claim 1, wherein the processor of the position estimation device is further programmed to generate direction information that indicates a movement direction of the moving object using the moving object coordinate point.

3. The system according to claim 1, wherein when the local coordinate point is transformed into the moving object coordinate point, the processor of the position estimation device is further programmed to substitute a value of the moving object parameter into a relational expression, which includes the moving object coordinate point as an objective variable and the local coordinate point, the imaging parameter, and the moving object parameter as explanatory variables.

4. The system according to claim 1, wherein the imaging parameter is a height of the imaging device from a road surface calculated based on the position of the imaging device in the global coordinate system, and the moving object parameter is a height of a predetermined positioning point of the moving object from the road surface.

5. The system according to claim 1, wherein the processor of the position estimation device is further programmed to:

generate a first mask image to which a mask region masking the moving object in the captured image is added;

perform perspective transformation of the first mask image; and correct a first coordinate point using a second coordinate point, the first coordinate point being a specified vertex of a first bounding rectangle set in the mask region in the first mask image, the second coordinate point being a vertex that indicates the same position as the first coordinate point from among vertices of a second bounding rectangle set in the mask region in a second mask image that is obtained by perspective transformation of the first mask image.

6. The system according to claim 5, wherein the processor of the position estimation device is further programmed to rotate the captured image so that a movement direction of the moving object faces a predetermined direction.

7. The system according to claim 5, wherein the processor of the position estimation device is further programmed to correct distortion in the captured image.

8. The position estimation and remote control system according to claim 1, further comprising:

the moving object; and the imaging device that acquires the captured image including the moving object subjected to position estimation.

9. A position estimation and remote control method, comprising:

acquiring a captured image including a moving object from an imaging device;

calculating, using the captured image a local coordinate point that indicates a position of the moving object in a local coordinate system;

identifying a type of the moving object included in the captured image;

transforming the local coordinate point into a moving object coordinate point, which indicates the position of the moving object in a global coordinate system, using (i) an imaging parameter calculated based on a position of the imaging device in the global coordinate system and (ii) a moving object parameter obtained by referring to a moving object database and determined according to the identified type of the moving object; and generating, based on the moving object coordinate point, running control signals for controlling running operation of the moving object, wherein the method further comprises:

calculating a difference between the obtained moving object parameter and a reference parameter that indicates a reference value of the moving object parameter to set a correction parameter, which indicates a correction value relative to the reference parameter and is determined according to the identified type of the moving object;

when the local coordinate point is transformed into the moving object coordinate point, substituting the correction parameter into a relational expression, which includes the moving object coordinate point as an objective variable and the local coordinate point, the imaging parameter the reference parameter, and the correction parameter as explanatory variables; and when the identified type of the moving object is a predetermined type, setting the correction parameter to zero without calculating the difference.

10. A non-transitory computer readable medium storing a computer program that, when executed be a processor of a position estimation device, causes the processor to execute functions comprising:

acquiring a captured image including the a moving object from an imaging device;

calculating, using the captured image, a local coordinate point that indicates a position of the moving object in a local coordinate system;

identifying a type of the moving object included in the captured image;

transforming the local coordinate point into a moving object coordinate point, which indicates the position of the moving object in a global coordinate system, using (i) an imaging parameter calculated based on the a position of the imaging device in the global coordinate system and (ii) a moving object parameter obtained by referring to a moving object database and determined according to the identified type of the moving object; and transmitting the moving object coordinate point to a remote control device for generating, based on the moving object coordinate point running control signals for controlling running operation of the moving object, wherein the computer program, when executed, causes the processor of the position estimation device to execute further functions composing:

calculating a difference between the obtained moving object parameter and a reference parameter that indicates a reference value of the moving object parameter to set a correction parameter, which indicates a correction value relative to the reference parameter and is determined according to the identified type of the moving object;

when the local coordinate point is transformed into the moving object coordinate point, substituting the correction parameter into a relational expression, which includes the moving object coordinate point as an objective variable and the local coordinate point the imagine parameter the reference parameter, and the correction parameter as explanatory variables; and when the identified type of the moving object is a predetermined type, setting the correction parameter to zero without calculating the difference.

* * * * *